(12) United States Patent
Zhang

(10) Patent No.: US 6,373,868 B1
(45) Date of Patent: Apr. 16, 2002

(54) SINGLE-MODE OPERATION AND FREQUENCY CONVERSIONS FOR DIODE-PUMPED SOLID-STATE LASERS

(76) Inventor: Tong Zhang, 245 S. 800 E., #6 Salt Lake City, UT (US) 84102

( * ) Notice: Subject to any disclaimer, the term of this patent is extended or adjusted under 35 U.S.C. 154(b) by 0 days.

(21) Appl. No.: 08/861,247

(22) Filed: May 21, 1997

Related U.S. Application Data

(63) Continuation-in-part of application No. 08/538,868, filed on Oct. 4, 1995, now abandoned, and a continuation-in-part of application No. 08/043,006, filed on May 28, 1993, now Pat. No. 5,515,394.

(51) Int. Cl.[7] .............................. H01S 3/098; H01S 3/13
(52) U.S. Cl. ............................................ 372/19; 372/32
(58) Field of Search .............................. 372/19, 32, 75, 372/101, 102, 106, 20

(56) References Cited

U.S. PATENT DOCUMENTS

| | | | | |
|---|---|---|---|---|
| 4,842,406 A | * | 6/1989 | vonBargen | 356/336 |
| 4,859,017 A | * | 8/1989 | Brierley et al. | 350/96.15 |
| 5,828,424 A | * | 10/1998 | Wallenstein | 348/760 |
| 5,970,076 A | * | 10/1999 | Hamada | 372/20 |

* cited by examiner

*Primary Examiner*—Quyen Leung

(57) ABSTRACT

Key technologies have been developed in realizing single longitudinal mode CW operation with a regular standing-wave cavity for intracavity frequency doubling and intracavity frequency conversions, so as to produce all solid-state, true cw devices with operation over wide spectral ranges including green, blue and UV. In one method, a beam expander (23 or 41) is applied to render a large mode waist and an improved beam divergence so as to greatly reduce the insertion losses for intracavity optical elements (17, 18 or 44). In another method, when spatial hole burning effect is minimized by using a pump head (12) with a thin gain zone (2), then a low resolving-power spectral filter with low loss can be utilized. In addition, several novel optical multipass constructions, typically by use of total-internal-reflection, have also been devised for pumping laser chips, laser rods, laser slabs, and for the use of multipass optical amplifier and pumping fiber lasers.

9 Claims, 18 Drawing Sheets

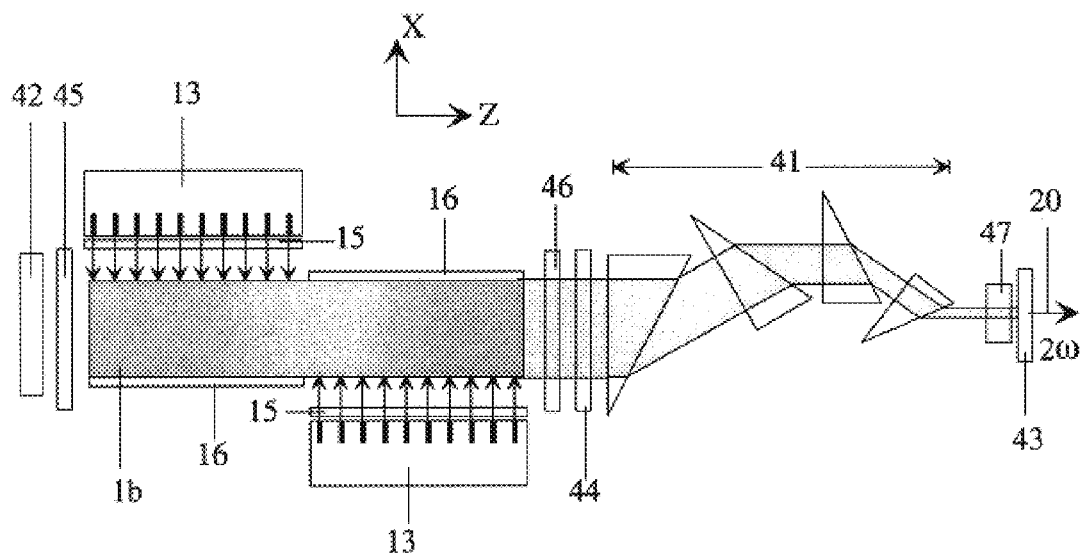
Fig. 2A
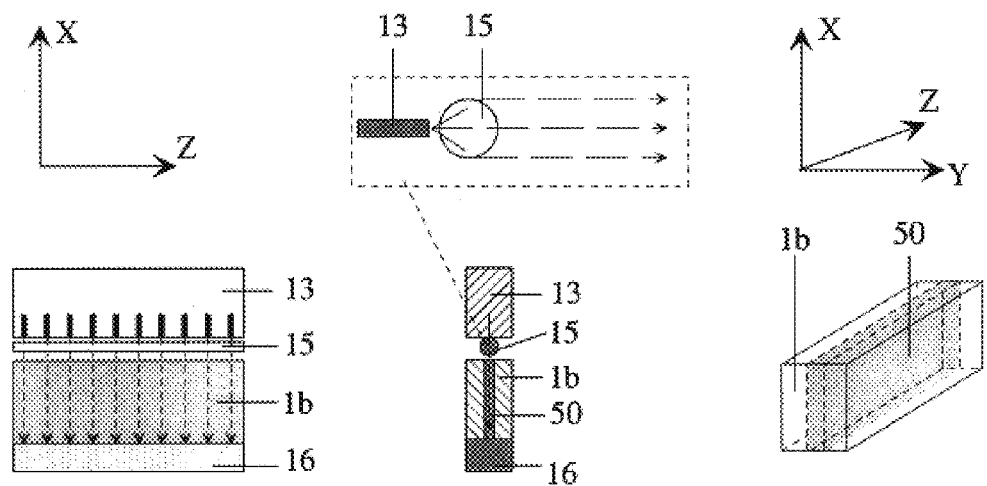
Fig. 2B  Fig. 2C  Fig. 2D

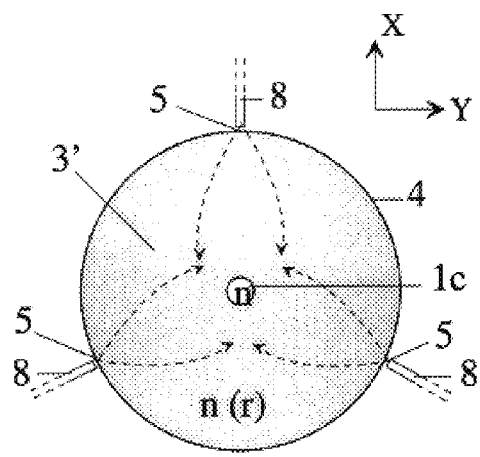
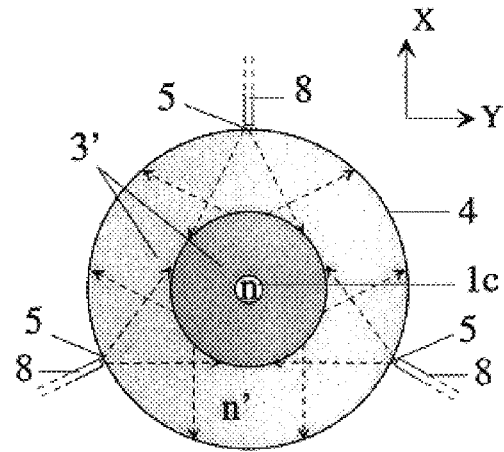
Fig. 3E            Fig. 3F
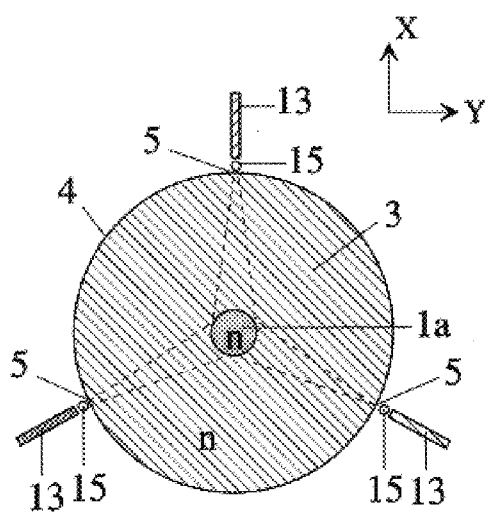
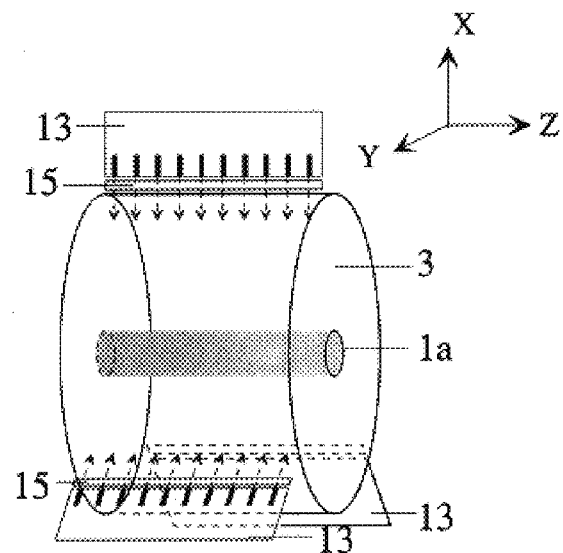
Fig. 4A            Fig. 4B

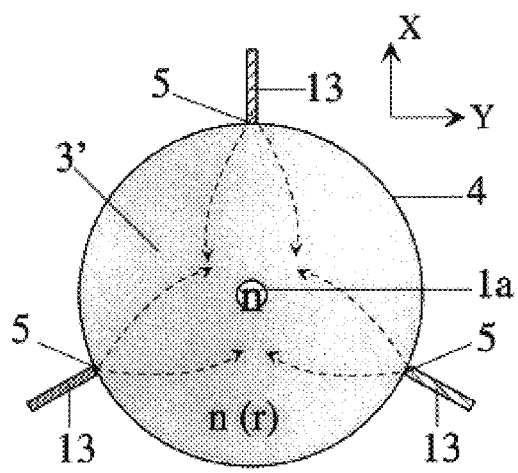
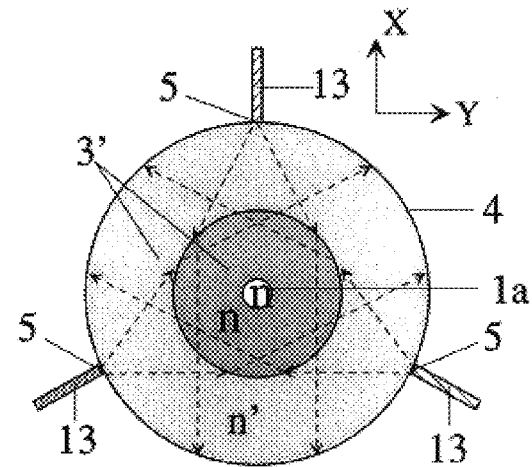
Fig. 4C                    Fig. 4D
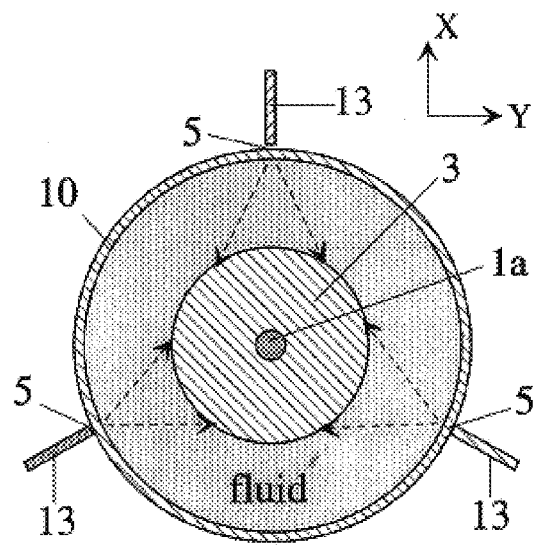
Fig. 4E

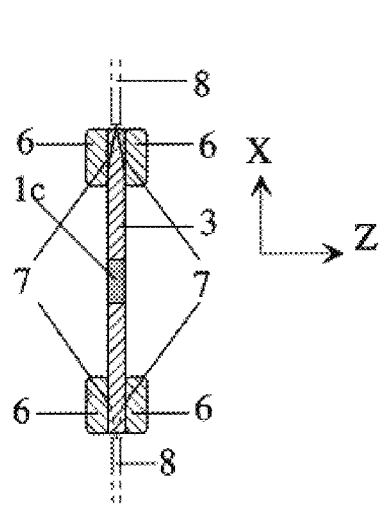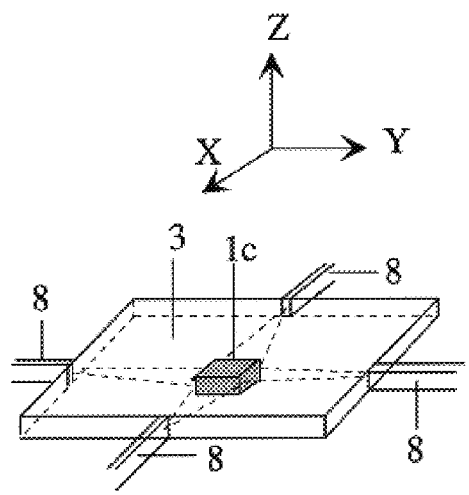
Fig. 5A    Fig. 5B
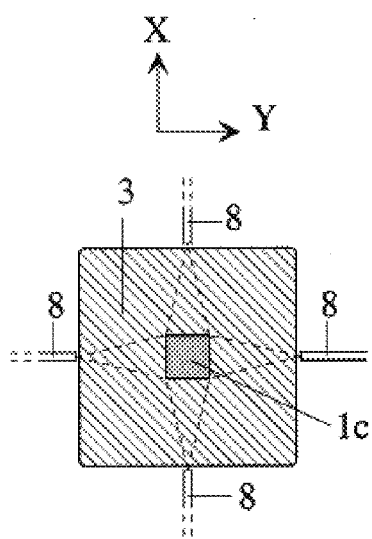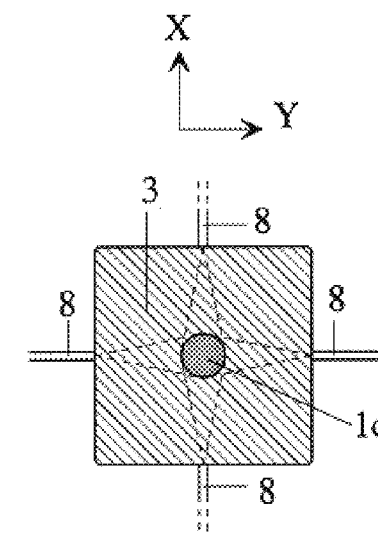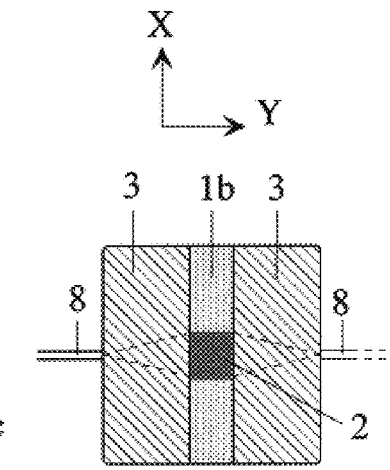
Fig. 5C    Fig. 5D    Fig. 5E

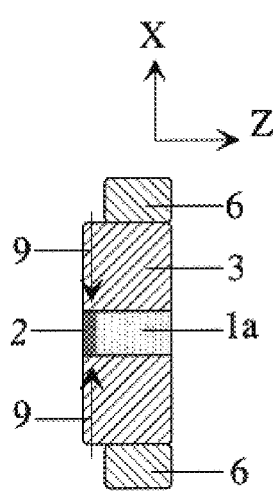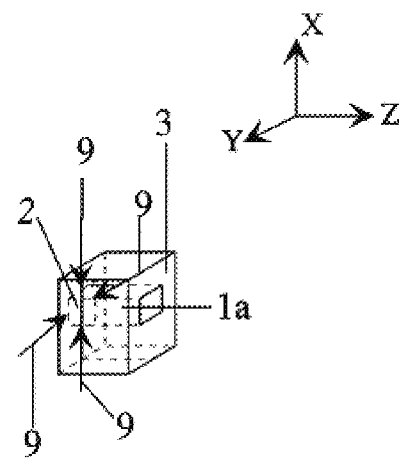
Fig. 6A  Fig. 6B
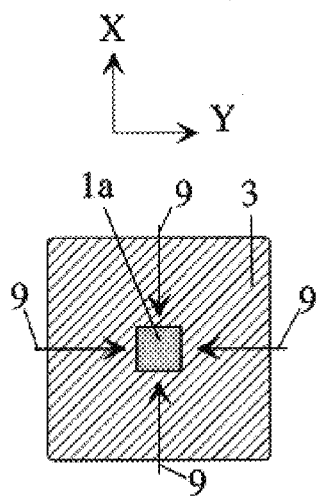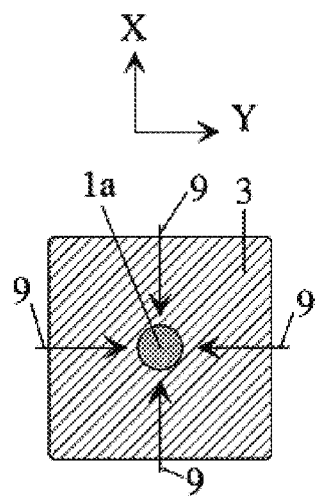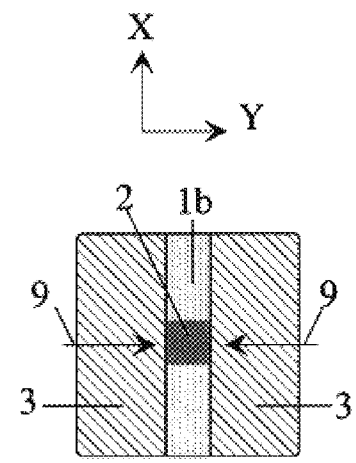
Fig. 6C  Fig. 6D  Fig. 6E

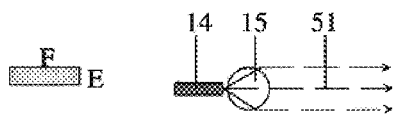
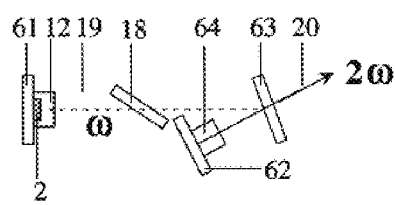
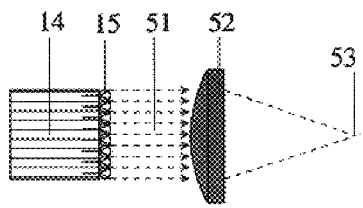
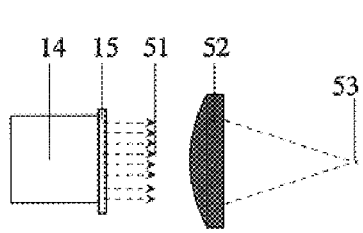
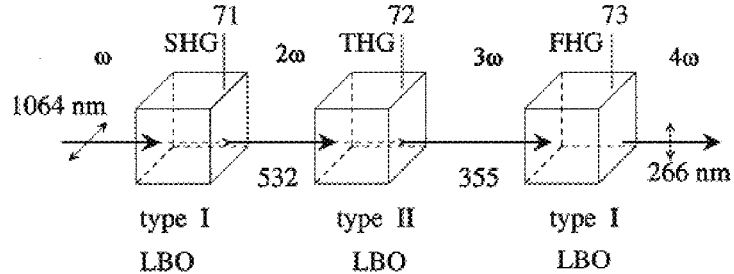

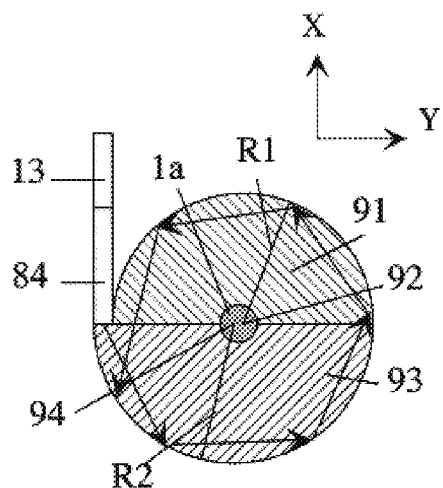
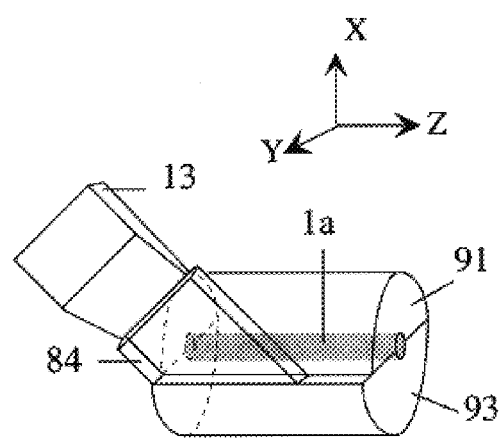
Fig. 16 A
Fig. 16 B
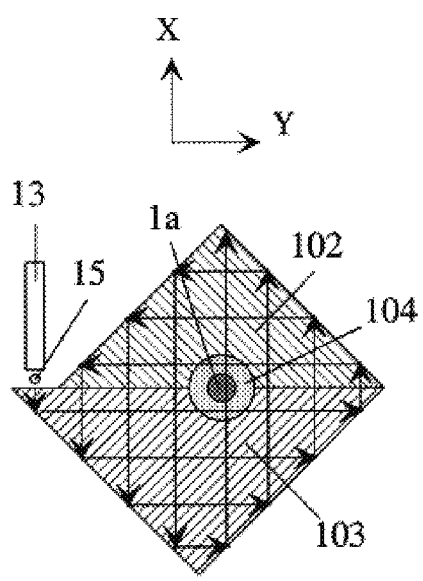
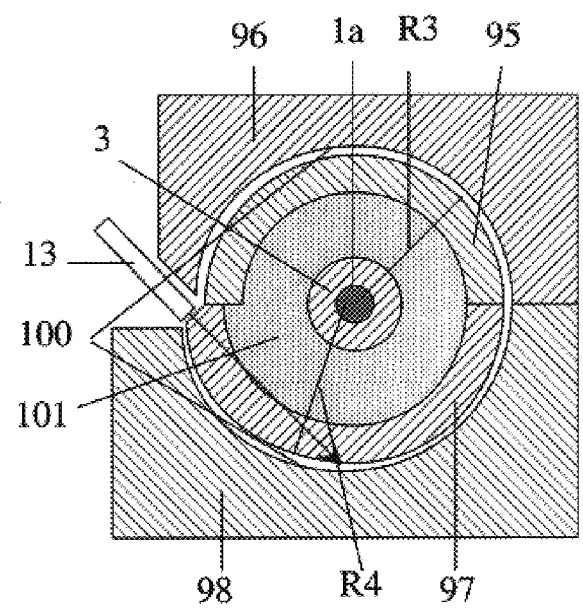
Fig. 16 C
Fig. 16 D

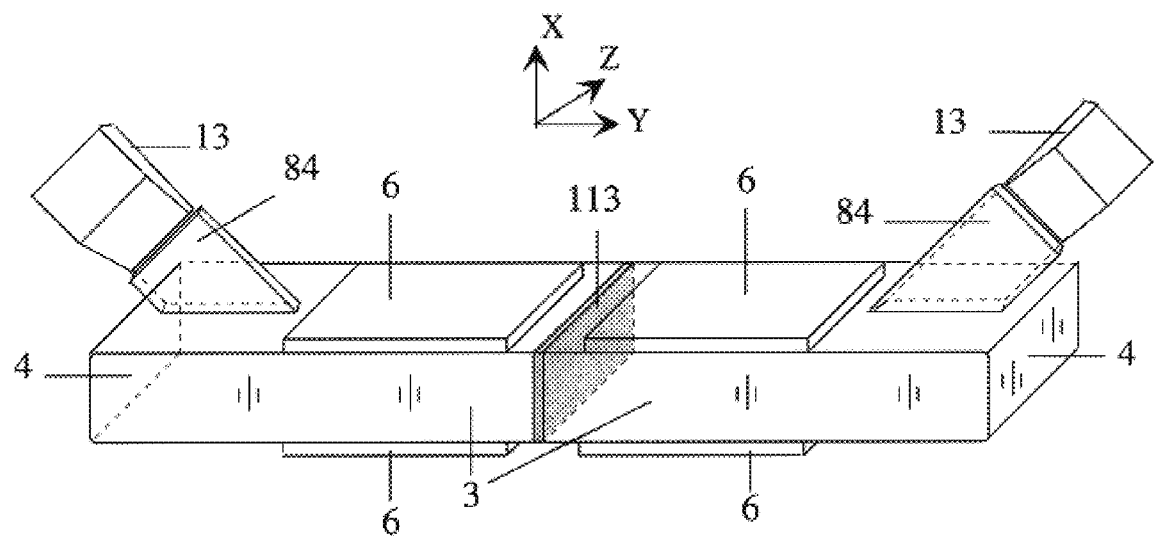
Fig. 17 A
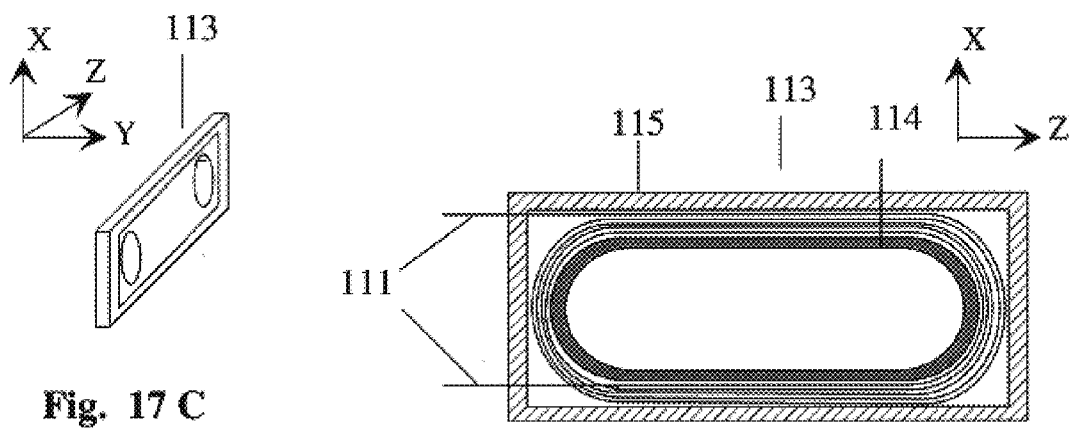
Fig. 17 C
Fig. 17 B
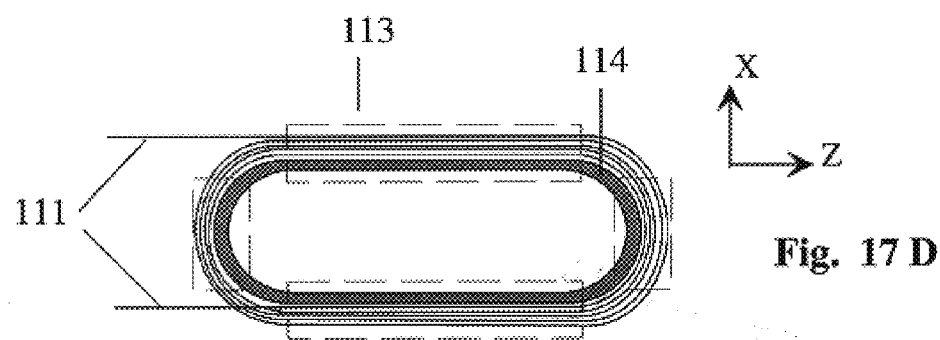
Fig. 17 D

SINGLE-MODE OPERATION AND FREQUENCY CONVERSIONS FOR DIODE-PUMPED SOLID-STATE LASERS

This is a continuation-in-part of Ser. No. 08/538,868, Filed Oct. 04, 1995, now abandoned after receiving the allowance; also, is a continuation-in-part of Ser. No. 08/043, 006, Filed May 28, 1993, now U.S. Pat. No. 5,515,394, granted 96. The former one refers to single-mode operation, frequency conversions and multipass pumping schemes for diode-pumped solid-state lasers, the latter refers to a pump head with a thin gain zone and the pre-narrowband approach for achieving single longitudinal mode operation.

FIELD OF INVENTION

This invention relates generally to laser pump/cavity/amplifier configuration design, and more particularly to realizing single longitudinal mode operation and intracavity frequency conversions for diode-pumped solid-state lasers, as well as optical multipass constructions for pumping laser media and fiber lasers, and for the use of multipass optical amplifier.

BACKGROUND OF INVENTION

Since the so-called "green problem" was discovered by T. Baer in 1986, it has become well known and has long plagued the stability of the CW intracavity harmonic generation of diode-pumped solid-state (DPSS) lasers. The essential difficulty in solving the "green problem" results from that, there is a persistent obstacle in effectively obtaining single longitudinal mode CW operation due to the spatial hole-burning effect in solid-state lasers. The related critical design issues are extremely tough. For the past decade, much research has attempted to solve this problem to obtain stable green light. Almost every effort has been made and nearly every way has been tried. However, none of true CW devices or designs has been successful by far with a regular standing-wave cavity. Only ring or very short cavity configurations have been used for this purpose, but they have appreciable inconveniences and limitations.

Baer, many AMOCO scientists and others did primary works and made some detailed reviews to the "green problem" in their papers and patents, such as the U.S. Pat. No. 5,164,947 (1992) and paper "Intracavity Doubling of CW Diode-pumped Nd:YAG laser with KTP," IEEE J. QE-28, 1148(1992). Baer recognized the "green problem" and pointed out that there was a fundamental barrier to successful multimode operation of intracavity doubled lasers. (Now, the "multimode operation" should be corrected to be "a few modes operation".) AMOCO and other scientists examined and worked out several important problems, including minimizing spatial hole burning effect with the "twisted mode" technology and the various polarization related problems, such as modifying the polarization of the laser modes in the doubling crystal to reduce the likelihood of chaotic amplitude fluctuations.

Controlling spatial hole burning can greatly reduce the possibility of amplitude oscillations. However, weak residual spatial hole burning resulted from imperfect "twisted mode" operation can still cause oscillations. In spite of those intense efforts, there remains a determining approach required to achieve dynamically stable single-mode operation with the use of a regular standing-wave cavity when the spatial hole-burning effect is present. What is needed is to provide a powerful form of wavelength selectivity to clamp the peak position of the operating frequency and prevent the laser operation from mode hopping and shifting to wavelengths outside the phase matching curve while controlling appreciable losses to the system.

On the other hand, an etalon within a cavity is commonly used to further control and suppress the harmful mode operation. Etalons typically have the highest spectral mode discrimination. However, the insertion of an etalon often leads to large passive losses and significantly reduces output power. This is especially true, for example, when the etalon is of high-finesse type, or the cavity has a small spatial mode waist and, hence, large beam divergence, and these effects are worse when the etalon is titled. Therefore, as simply inserting an etalon to a laser cavity, these characteristics often lead to the failure of laser operation.

AMOCO scientists realized and considered this key factor and were very close to success. In fact, there was almost one step behind to win the battle of the "green problemn". Although they did not cross this decisive step, they have demonstrated several important concerns over the unsolved difficulties inherent in the "green problem" under the condition of single-mode operation. Following are the major concerns in their paper.

(1) "The intracavity harmonic generation laser is much more sensitive to component quality and the associated insertion loss than are most other lasers. To build an efficient intracavity harmonic generation laser, one needs to find some forms of mode selectivity with low loss, which is a significantly difficult task. On the other hand, if enough constraints are placed on the cavity without introducing appreciable losses to the system, stable and efficient operation of intracavity harmonic generation lasers is possible."

(2) "The doubling efficiency is extremely sensitive to the finesse of the laser cavity so that all these controls must be introduced into the laser cavity without adding appreciable loss to the system."

(3) "The principle difficulty with this design is that combining a polarizer and a highly birefringent element with a relatively small mode radius (w=100 um) can lead to significant losses. It is found that the green and 1064 nm output from cavities containing Brewster plates are often substantially smaller than those in similar cavities without Brewster plates. A 100 um beam has a far-field divergence angle of 3.4 mr; the off-axis components of the beam are appreciably depolarized by the angle-dependent refractive index. The phase shifts are only a fraction of a wave, but in the presence of a polarizer, these correspond to losses on the order of a fraction of a percent."

In conclusion, their major point focuses on that, a relatively small mode waist can lead to significant insertion losses for the intracavity optical elements, particularly for an inserted etalon or Brewster plate in the present case.

SUMMARY OF THE INVENTION

In order to overcome the dominant difficulties in the prior art, the present invention offers two solutions for obtaining a dynamically stable single-mode operation with regular standing-wave cavities. These two different methods can be used separately, or collectively at the same time to be more powerful and effective.

(1) Cavity designs with a beam expander are applied to render a large mode waist and an improved beam divergence, so as to significantly reduce the insertion losses for intracavity optical elements, typically for a tilted etalon and Brewster plate; and (2) A pump head with a thin gain zone is applied to minimize the spatial hole-burning effect. The effect caused by a thin gain region is equivalent to that caused by short cavity configurations in which longitudinal modes are separated substantially, so that the required resolving-power of a frequency-selective form will be largely relaxed, and it becomes possible to use a spectral filter with low insertion losses, such as a birefringent filter or a low-finesse etalon, in realizing single-mode operation.

Further, the thickness of a thin gain zone is considered a critical factor to minimize the spatial hole-burning effect. To construct a thin gain zone at the end of a solid-state laser medium, there are several practical limitations to the commonly-used pumping schemes. The conventional side-pumping schemes are not capable of producing such a thin gain region. On the other hand, the constraints on the end-pumping scheme result from the need of a laser medium with a very large absorption coefficient and a very limited thickness. Therefore, a need still exists in the art to provide an effective method to serve this purpose. Consequently, in the present invention the multipass waveguide pump head has been developed for producing a thin gain zone within a laser medium.

Besides, once successfully solving the "green problems" for the intracavity second harmonic generation and obtaining a stable green light output, a new and promising way appears for the development of intracavity third and fourth harmonic generations, which can directly and effectively produce CW UV coherent light from one-single-stage cavity with using two or three nonlinear crystals in a serial manner. This offers a much more attractive solution than the external resonant cavity frequency doubling technology in the art. Nevertheless, such a design used to be considered infeasible in the field.

Further, it is not difficult to produce coherent light over wide spectral ranges from infrared to visible by using the OPO technologies. However, the most OPOs developed for the pulsed mode are not appropriate for CW-mode operations. Intracavity frequency mixing, in contrast to the OPO, is capable of producing coherent light with the CW-mode over wide spectral ranges from infrared to ultraviolet. Based on the technologies developed for frequency doubling, several closely related schemes for frequency mixing and high order harmonic generation are demonstrated for extending the utility of the present invention.

Concurrently, the objects of the present invention are presented as follows.

The major object of the invention is to develop a key technology for overcoming the fundamental barrier to intracavity frequency conversions in DPSS lasers, typically to frequency doubling caused by the so-called "green problem", which will result in all solid-state, CW, green, blue or UV light lasers.

Another object of the invention is to find a form of wavelength selectivity with an acceptable low insertion loss in realizing single-mode operation. Such a form typically is a spectral filter incorporated with a beam expander.

Yet, another object of the invention is to use a low resolving-power spectral filter relative to a low frequency-selective loss under the condition of using a pump head with a thin gain zone that leads to minimizing the spatial hole-burning effect, so as to realize single-mode operation.

Consequently, a further object of the invention is to construct a multipass waveguide pump head for producing a thin gain zone, capable of maximizing the absorption and concentrate pumping power within a regular solid-state laser material of a small volume around or less than 1 mm$^3$.

Another object of the invention is to provide a way for frequency doubling in which it is considered unnecessary to keep a nonlinear crystal, such as KTP, as a full- or half-wave plate at the fundamental wavelength with temperature control.

Yet, another object of the invention is to provide a way rather than the "twisted mode" technology to minimize the spatial hole burning effect so as to allow using a laser medium with the exhibition of birefringences.

Still another object of the invention is to provide a compact cavity design by inserting a beam expander, which offers a large $TEM_{00}$ mode volume in the laser rod for mode-matched pumping and a high power intensity in the nonlinear crystal for efficient nonlinear optics actions at the same time, and to achieve a compensation of the thermal lens effect, good beam quality and power scaling.

A further object of the invention is to provide a laser-cavity design with a large $TEM_{00}$ mode volume so that it becomes possible to use the side-pumping scheme including the use of a corner reflector pump head. The end-pumped laser output power is highly sensitive to the losses as may be introduced by the insertion of intracavity elements such as a quarter-wave plate, which is usually used for producing the "twisted mode" operation.

A still further object of the invention is to provide a laser-cavity design to render a large $TEM_{00}$ mode waist and an improved beam divergence resulting in a great reduction of the insertion loss. This would allow the use of an etalon made from even the green-absorbing material with a relatively large scatter loss. Such an etalon is capable of absorbing the backward-going second harmonic beam so that the intracavity green light feedback effects are minimized.

Yet, another object of the invention is to provide a laser-cavity arrangement to directly and effectively produce a CW UV output from one-single-stage cavity.

Still another object of the invention is to make a laser-cavity arrangement serve as a high-performance intracavity wavelength converter for frequency mixing, which is able to produce true CW coherent light over wide spectral ranges, from infrared to ultraviolet.

Yet, another object of the invention is to provide an approach to center and overlap the bandpasses of several spectral filters and the cavity mode for a hierarchy of frequency-selective set inside a laser cavity so as to stabilize laser operation and maximize the output power.

An additional object of the invention, in accordance with the pump approaches used for the multipass waveguide pump head in producing a thin gain zone, is to develop multipass pumping geometry for pumping laser rods or slabs, or even for pumping optical fiber with rare-earth dopants. The two major approaches are advanced. The first one is characterized by i) the pump cladding which surrounds a much smaller laser material, is designed to have a graded-index or step-index, or ii) using noncircular profile reflector; so that diode bars can directly be coupled for pumping without coupling optics. The second approach is characterized by that the multipass pump head is constructed as an optical waveguide so as to optimize the reflectivity and the pump efficiency.

Another object of the invention is to provide a novel approach in the use of the beam guide input coupler to couple the uncollimated pumping beams from diode bars to a multipass waveguide pump head, resulting in the controlled angles of incidence of the pumping beams so as to accommodate the pumping beams with total-internal-reflection.

Yet, another object of the invention is to provide a novel approach in the use of the beam guide input coupler to couple the collimated pumping beams from diode bars to a multipass waveguide pump head, resulting in the controlled distribution of the angles of incidence of the pumping beam within a small range so as to meet the satisfaction for total-internal-reflection.

Another object of the invention is to provide an approach to protect total-internal-reflection for an optical surface from the so-called "frustrated total-internal-reflection" when it is contacted with other substances.

Yet, another object of the invention is to provide a novel multipass optical-amplifier design.

DESCRIPTION OF THE DRAWINGS

In the drawings, closely related figures have the same number but different alphabetic suffixes. As to the XYZ directions presented in the figures where a laser cavity is involved, the Z direction is always along and the XY plane is always perpendicular to the optical axis of the laser cavity, respectively. All the drawings are presented with the schematic diagram for illustrative purposes.

FIG. 2A shows a cavity arrangement with a prism beam expander for single-mode operation and intracavity frequency doubling similar to that shown in FIG. 1B. This is a variation on the first laser-cavity embodiment in accordance with the present invention.

FIGS. 2B–D shows a pump arrangement used in FIG. 2A, and it provides a gain region in the shape of a thin layer.

FIG. 3E is the side sectional view of a graded-index disk-waveguide pump head in the case of 3-side pumping same as FIGS. 3A–C, in which a solid-state laser chip is surrounded by a graded-index pump cladding.

FIG. 3F is the side sectional view of a step-index disk-waveguide pump head in the case of 3-side pumping same as FIGS. 3A–C, in which a solid-state laser chip is surrounded by a step-index pump cladding.

FIGS. 4A and 4B are, respectively, the side sectional and perspective views of a cylinder reflector pump head with a multipass pumping geometry for pumping a regular solid-state laser rod surrounded by a pump cladding pumped by three linear array laser diode bars from three directions. The cooling parts are not shown for simplicity. This is a variation on the first pump embodiment in accordance with the present invention.

FIG. 4C is the side sectional view of a graded-index cylinder reflector pump head in the case of 3-side pumping same as FIGS. 4A–B, in which a regular solid-state laser rod is surrounded by a graded-index pump cladding. The cooling parts are not shown for simplicity.

FIG. 4D is the side sectional view of a step-index cylinder reflector pump head in the case of 3-side pumping same as FIGS. 4A–B, in which a regular solid-state laser rod is surrounded by a step-index pump cladding. The cooling parts is not shown for simplicity.

FIG. 4E is the side sectional view of a hollow cylinder reflector pump head with a cylindrical envelope in the case of 3-side pumping similar to FIGS. 4A–B, in which a regular solid-state laser rod is surrounded by a regular pump cladding. A fluid with a proper refractive index is filled to provide the step-index structure and cooling.

FIGS. 5A, 5B and 5C respectively are the front sectional, perspective and side sectional views of a variation of the pump arrangement shown in FIGS. 3A–D, but with the exclusion of multipass.

FIG. 5D is the side sectional view of a pump arrangement with 4-side pumping, in which a pump cladding has a square shape and solid-state laser chip has a circular shape.

FIG. 5E is the side sectional view of a pump arrangement with 2-side pumping similar to FIGS. 5A–D, in which a solid-state laser slab is sandwiched by two pieces of pump cladding.

FIGS. 6A, 6B and 6C are, respectively, the front sectional, front perspective and side sectional views of a pump arrangement which produces a thin gain region at the end of a solid-state laser bar in the case of 4-side pumping. This is the second pump embodiment in accordance with the present invention.

FIG. 6D is the side sectional view of a pump arrangement same as that shown in FIGS. 6A–C except that a laser rod is used instead of a laser bar.

FIG. 6E is the side sectional view of a pump arrangement with 2-side pumping similar to FIGS. 6A–C, in which a solid-state laser slab is sandwiched by two pieces of pump cladding.

FIGS. 7A and 7B respectively show the front and top plane views of a pump arrangement for producing shaped pumping beams with using a 2-D stacked laser diode bar.

FIG. 7C is the magnified sectional view of the focus spot of the shaped pumping beams.

FIG. 7D is the magnified sectional view of a single layer structure in 2-D diode bars with a relevant collimating rod lens.

FIG. 9 shows a cavity arrangement without a beam expander for single-mode operation and intracavity frequency doubling, in which a pump head with a thin gain zone and a birefringent filter formed by a Brewster plate and a birefringent KTP are applied for obtaining single-mode operation. It is the third laser-cavity embodiment in accordance with the present invention.

FIG. 10 shows an arrangement for intracavity fourth harmonic generation with using three non-linear crystals, and it directly produces CW UV output from one-single-stage cavity. A relevant cavity arrangement can be chosen from those shown in FIGS. 1A–C, 2A, 2E, and 7A–C, or even in FIG. 8.

FIGS. 16A–B show the first Dube waveguide pump head.

FIG. 16C shows the side sectional view of the second Dube waveguide pump head.

FIG. 16D shows the side sectional view of the Dube step-index double-layer reflector pump head.

FIGS. 17A–D illustrate a pump arrangement and it provides multipass side-pumping for pumping an optical fiber with a rare-earth-doped core and is used for fiber lasers and fiber amplifiers. FIGS. 17B or 17D, and 17C respectively are the side and perspective views of a fiber assembly. This pump arrangement is same as that shown in FIGS. 13A–B except that the laser slab is replaced by a fiber assembly. This is the first pump embodiment for pumping optical fiber in accordance with the present invention.

FIG. 18A shows a multipass geometrical path of a input signal being amplified within a disk-waveguide. FIG. 18B is the perspective view of a multipass optical amplifier.

REFERENCE NUMERALS IN DRAWINGS

Figure 1B:
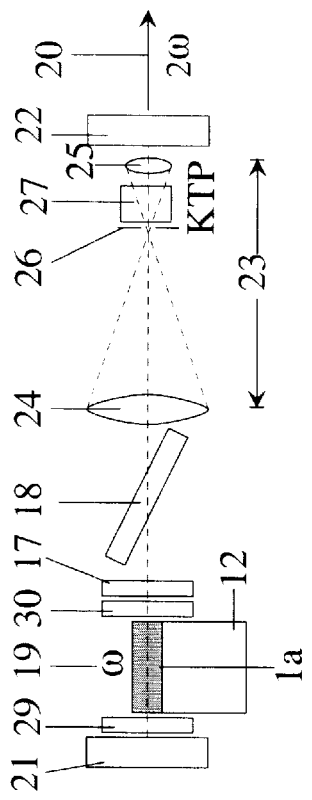
FIG. 1B shows a cavity arrangement for single-mode operation and intracavity frequency doubling same as that shown in FIG. 1A except adding a polarizer, resulting in a hierarchy of frequency-selective formation with three separate levels of frequency selectivity.

| | |
|---|---|
| 1a | solid-state laser rod/bar |
| 1b | solid-state laser slab |
| 1c | solid-state laser chip |
| 2 | thin gain zone |
| 3 | pump cladding |
| 3' | pump cladding with graded- or step-index |
| 4 | HR coating on the surface of pump cladding |
| 5 | spectral opening |
| 6 | heat sink block/cooler |
| 7 | aluminum foil |
| 8 | fiber bundle |
| 9 | shaped pumping beams |
| 10 | cylinder reflector |
| 11 | pump head |
| 12 | pump head with a thin gain zone |
| 13 | linear array laser diode bar |
| 14 | 2-D stacked diode bar |
| 15 | collimating lens/rod lens/cylindrical fiber lens |
| 16 | grating reflector |
| 17 | etalon |
| 18 | Brewster plate |
| 19 | fundamental radiation |
| 20 | harmonic output |
| 21 | rear mirror |
| 22 | front/output mirror |
| 22' | cavity mirror with phase-preserving |

-continued

| | |
|---|---|
| | coating |
| 23 | beam expander/spatial filter |
| 24 | object lens |
| 25 | eye lens |
| 26 | aperture |
| 27 | nonlinear crystal |
| 28 | folding mirror/polarizing reflector |
| 29 | quarter-wave plate |
| 30 | quarter-wave plate |
| 31 | radiation at $\omega_1$ |
| 32 | cavity mirror |
| 33 | cavity mirror with phase-preserving coating |
| 34 | folding mirror |
| 35 | input radiation at $\omega_2$ |
| 36 | output radiation at $\omega_3 = \omega_1 \pm \omega_2$ |
| 37 | nonlinear crystal for mixing |
| 41 | prism beam expander |
| 42 | rear mirror |
| 43 | front/output mirror |
| 44 | etalon |
| 45 | quarter-wave plate |
| 46 | quarter-wave plate |
| 47 | nonlinear ctystal |
| 48 | folding/output mirror |
| 49 | cavity mirror with phase-preserving |
| 50 | gain region |
| 51 | collimated pumping beams |
| 52 | lens or lens set |
| 53 | focus spot |
| 61 | rear mirror |
| 62 | cavity mirror with phase-preserving coating |
| 63 | folding/output mirror |
| 64 | nonlinear crystal KTP |
| 71 | SHG crystal LBO |
| 72 | THG crystal LBO |
| 73 | FHG crystal LBO |
| 81 | noncircular reflector |
| 82 | coolant channel block |
| 83 | coolant passage |
| 84 | prism coupler |
| 85 | HR coating |
| 86 | gap plate/mirror |
| 91 | upper pump cladding with radius R1 |
| 92 | center of 91 |
| 93 | lower pump cladding with radius R2 |
| 94 | center of 93 |
| 95 | upper pump cladding |
| 96 | lower pump cladding |
| 97 | cooling fluid |
| 101 | upper inner sleeve with radius R3 |
| 102 | upper outer sleeve |
| 103 | lower inner sleeve with radius R4 |
| 104 | lower outer sleeve |
| 105 | HR coating at pump wavelength |
| 106 | cooling fluid |
| 111 | optical fiber with a rare-earth-doped core |
| 112 | double-clad optical fiber with a rare-earth-doped core |
| 113 | optical fiber assembly |
| 114 | inner frame |
| 115 | outer frame |
| 121 | input signal |
| 122 | output signal |
| 123 | pumping light |

DESCRIPTION

Part I Using "Twisted Mode" for SLM Operation with SHG FIGS. 1A–D to FIGS. 2A–F

There are two major goals in the present invention. One goal is to realize dynamically stable single-mode or narrow-band operation with a regular standing-wave cavity for diode-pumped solid-state lasers leading to overcoming the difficulty in intracavity frequency conversions, typically in frequency doubling that is often caused by the so-called "green problem". The other is to provide several similar compact cavity designs to achieve mode-matched pumping, compensation of the thermal lens effect, good beam quality, high power operation and efficient frequency conversions.

Beam expanding cavities are considered to be the most capable of handling the critical design issues caused by intracavity harmonic generations and of accommodating those requirements to these two major goals at the same time. The two different beam expanding cavities for DPSS lasers are discovered in the two original patents of U.S. Pat. Nos. 5,548,608 (1996) and 5,515,394 (1996).

The high efficient frequency conversion requires a high power density which is generally not available from CW-operated lasers. A ready solution for this problem is to place the nonlinear crystal inside the laser resonator. Moreover, the beam cross section inside the nonlinear crystal should be small enough. Concurrently, the beam cross section inside the laser rod must be large enough to utilize the maximum rod volume which can contribute to $TEM_{00}$ mode oscillation. This generally requires that the beam cross-sectional area inside the laser rod be at least one order of magnitude larger than that inside the nonlinear crystal.

In this part, the "twisted mode" technology in the use of a pair of quarter-wave plates is applied to minimize the spatial hole-burning effect. In order to attain dynamically stable single-mode operation, a beam expander and an inserted etalon, or a hierarchy of frequency-selective set constituted of several spectral filters with low insertion losses are employed.

Figure 1A:
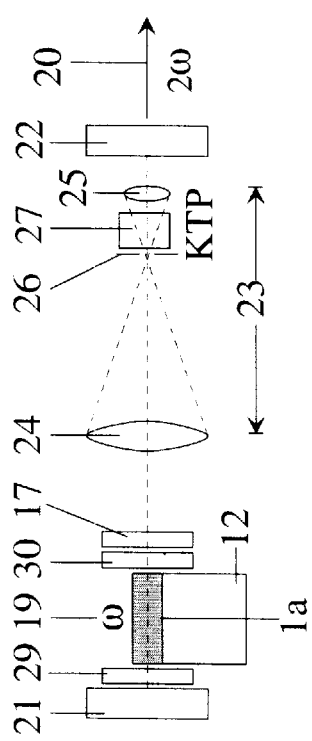
FIG. 1A shows a cavity arrangement for intracavity frequency doubling with a beam expander and an internal nonlinear crystal, in which minimizing the spatial hole-burning effect is achieved by the "twisted mode" operation and a stable narrowband operation is realized by an inserted etalon. This is the first laser-cavity embodiment in accordance with the present invention.
Figure 1D:
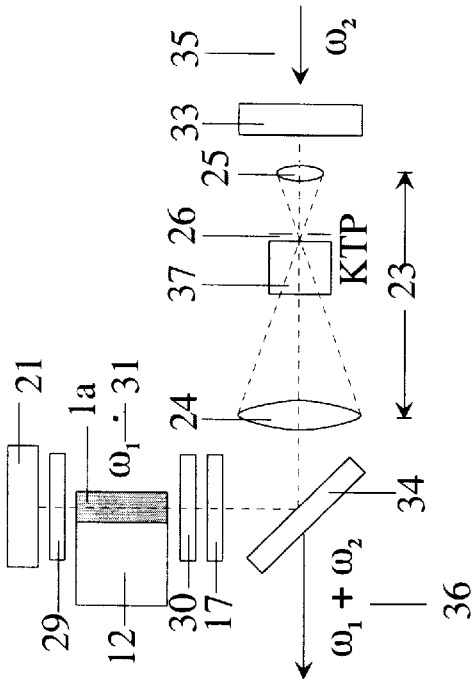
FIG. 1D shows a folded cavity arrangement similar to that shown in FIG. 1C, but used for intracavity frequency mixing. It is the first embodiment for intracavity frequency mixing in accordance with the present invention.
Figure 1C:
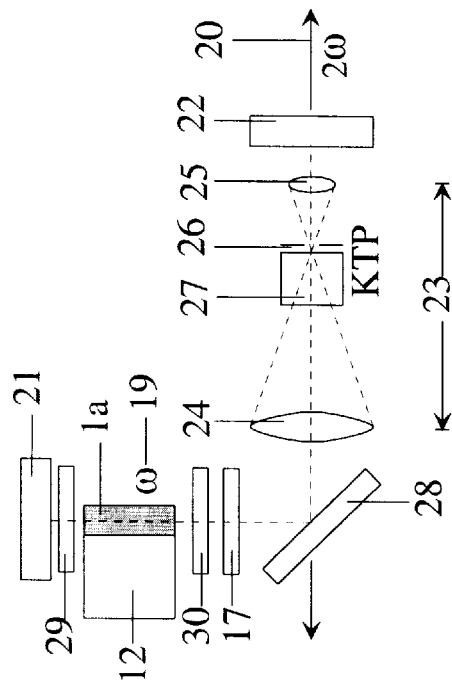
FIG. 1C shows a folded cavity arrangement for single-mode operation and intracavity frequency doubling similar to that shown in FIG. 1B.

The schematics of the beam expanding cavity, which involve the use of a two-dimensional beam expander, i.e., a telescope, and internal nonlinear crystal are shown in FIGS. 1A–C for frequency doubling, and FIG. 1D for frequency mixing, respectively. A beam expanding cavity can easily be modified to a folded cavity, such as V-shaped or L-shaped, as shown below. A pump head 11 with a laser rod/bar 1a, preferably a corner reflector pump head or a multipass cylinder reflector pump head, is placed at one side of a cavity for lasing. A beam expander 23 with an internal nonlinear crystal is set at the other side of the cavity.

Beam expander 23 is formed by an AR coated lens pair, i.e., an eye lens of focal length $f_1$ and an object lens 24 of focal length $f_2$, and an aperture 26 which is placed at the focal plane where a diffraction-limited point occurs. A nonlinear crystal is inserted adjacent to aperture 26 for intracavity frequency doubling or mixing. Beam expander 23 has magnification $M=f_2/f_1$. The distance between lens 24 and lens 25 is adjustable thereby to obtain a small defocusing for the compensation of the thermal lens as scaling to a high pump level. The degree of defocusing can be further actively controlled by a control means for different pump/output power levels and for obtaining good stability against thermal lens fluctuations.

Aperture 26 is an internal iris diaphragm whose adjustment allows $TEM_{00}$ mode operation. Beam expander 23 is hence configured as a spatial filter at the same time to produce an output of an excellent spatial quality.

By way of example, the preferred design parameters are selected as follows: The cavity length is around 15 cm; the magnification M is around 5–10×; focal length $f_2$ is between 6 cm and 8 cm and has to be chosen correctly, depending on the demanded $TEM_{00}$ mode volume and the nonlinear crystal acceptance angles; and focal length $f_1=f_2/M$. The rear mirror, front mirror and folded mirror should be referred to cavity design criteria and polarization requirement. The outer surface of one end cavity mirror serving as an outcoupler is preferably convex for the output beam correction.

In addition, the rays shift caused by the walk-off effect in the case of using the KTP needs to be corrected. The two identical pieces of the KTP crystal oriented properly may be applied for the compensation.

Many papers or books have elaborated the use of telescopic resonators. D. C. Hanna et al. Opt. Quant. Electr. 13 (1981), p.493 and Opt. Quant. Electr. 7 (1975), p.115, made a detailed analysis for the choice of design parameters, such as the mode spot sizes, resonator length, telescope magnification and defocusing, mirror curvatures, placements and spacings of all intracavity elements, alignment tolerance of mirrors and so on. Several relevant computer programs or softwares to serve this purpose are also commercially available. A person skilled in the art would be able to carry out an applicable cavity design.

On the other hand, the selection of the magnification M depends to a large extent on the requirement from the inserted optical element such as an etalon. The reason is, the larger the M, the larger is the mode waist, thus the better is an improved beam divergence and the greater is a reduced walk-off loss, therefore leading to a larger decrease of the insertion losses. In addition, the passive bandwidth of the etalon is also improved.

In the following some embodiment examples of the invention are explained in more detail with reference to the drawing, in which FIG. 1A shows a schematic side view of a laser-cavity arrangement for intracavity frequency doubling with a beam expander 23 and an internal nonlinear crystal 27. This is the first laser-cavity embodiment in accordance with the present invention. Both cavity mirrors 21, 22 have HR coatings for the fundamental radiation 19. Front mirror 22 is transparent for second-harmonic output 20. Nonlinear crystal 27, i.e., a frequency doubler, preferably a KTP crystal, is placed on the right side of aperture 26 for the frequency doubling. All optical surfaces of inserted elements, including both faces of crystal 27, are AR coated for fundamental radiation 19.

In order to minimize spatial hole burning and attain single-mode operation, a pair of quarter-wave plates (QWP) 29, 30 are positioned adjacent to opposite ends of laser medium 1a for producing the "twisted mode" operation—circular polarization in the gain medium. In most situations, the principal axes of QWPs 29, 30 are rotated by an angle of 45° or 90° with respect to each other.

Nonlinear crystal 27 needs to be set and oriented properly for phase-matching. For KTP type II phase-matching, the E and O axes of the crystal is oriented at 450 to the field direction of the linearly polarized fundamental wave. In general, a frequency doubler with birefringence would cause an additional phase change and then needs to be kept as a full- or half-wave plate at the fundamental wavelength so as to not degrade the "twisted mode" operation. Thus, this leads to a critical requirement for the strict temperature control of KTP crystal 27.

However, in a certain condition this limitation would be released from that as the eigenvector is not affected by the amount of birefringence of KTP 27. This feature resulted in a significant advantage as using type-II doubling and were indicated by D. W. Anthon et al., IEEE J. QE-28, 1148(1992) and H. Nagai et al., IEEE J. QE-28, 1164(1992). In their setup the axis of QWP 29 is rotated by 45° to the axis of QWP 30 and aligned to be parallel to the axis of KTP 27. It can be showed by using standard Jones matrix calculus and proved by a relevant experiment.

Further, for the "twisted mode" operation, the laser transition should be equally stimulated by any transverse polarization of the standing-wave electrical field. Thus it is necessary to employ a nonbirefringent laser medium or a laser medium made and oriented without the exhibition of birefringences.

The residual spatial hole burning can be controlled by a form of wavelength selectivity, preferably an etalon 17. As an alternative, it may be further simplified when QWP 30 is made and acts functionally as an etalon at the same time.

On the other hand, due to KTP 27 being placed at the right side of aperture 26, the green light feedback reflected from etalon 17 is effectively blocked off and minimized. For example, the size of the pin-hole of aperture 26 is around 60 um, etalon 17 tilted by 0.15° will result in a deviation of around 150 um from the center for the feedback light. Moreover, a green-absorbing material for inserted etalon can be selected to absorb the backward-going second harmonic beam. In addition, considering the relatively small space in the laser cavity, it is preferable to assemble aperture 26 and KTP 27 together. In such case, eye lens 25 and object lens 24 are both AR coated at the fundamental and doubling wavelengths; and this principle can also be applied for FIGS. 1B–D and FIGS. 8A–B.

As an alternative, KTP 27 can be moved out from beam expander 23 and positioned between eye lens 25 and front mirror 22 to gain a larger space and to favor using long crystals.

FIG. 1B is a cavity arrangement same as that shown in FIG. 1A except adding a polarizer, such as a Brwester plate 18. Hence, there are more than one level of frequency selectivity with such a configuration. A polarizer and birefringent elements which are made as a full- or half-wave plate within a cavity will function like a birefringent filter, i.e., a Lyot filter or a monochromatic polarizer.

It is important to have more than one spectral filter for a gain medium with a broad lasing bandwidth. In such case, one frequency-selective element is usually not sufficient to uniquely determine the laser oscillation frequency. A hierarchy of frequency-selective set inside a laser cavity with a few separate levels of frequency selectivity needs to be used to force the laser to oscillate on a specific longitudinal mode. Lacking this hierarchy of frequency selectivity, the laser may oscillate with many modes, or it may oscillate with a single mode that is unstable to small perturbations and jump from mode to mode as a function of time.

As such, there are two Lyot filters inherently in the case using type-II doubling. The first one is formed by polarizer 18 and KTP 27. The second one is formed by polarizer 18 and a pair of QWPs 29, 30. In addition, the third one may be added which is formed by polarizer 18 and etalon 17 which is made from a birefringent material.

A birefringent etalon has a high resolving power which is the same as that of a etalon and a wide free spectral range which is the same as that of a Lyot filter. It has its own wavelength tuning character which depends on the direction of rotation axis. But sometimes it is the same as that of an etalon in a certain direction. Moreover, in the case using type-I doubling, there are still two Lyot filters left to be used.

In order to work in an optimum way for a composite Lyot filter with one more birefringent elements, the optical path length of each element, i.e., $(n_o-n_e) \times$ thickness which produces a phase retardation should be integrally related to the others.

For the present case, a preferred embodiment for a hierarchy of frequency-selective set has three separate levels of frequency selectivity, consisting of two Lyot filters and one etalon. It starts on the least selective end and the largest free spectral range with a Lyot filter which is formed by Brwester plate 18 and a pair of QWPs 29, 30. This is followed by another Lyot filter which is formed by Brwester plate 18 and KTP 27 and, then etalon 17 with progressively higher resolution.

The overlap of the transmittance peaks of the three spectral filters provides a net transmittance bandwidth that must be narrow enough to uniquely determine a single mode for laser oscillation. The resolving-powers of the three levels of frequency-selectivity should be chosen to ensure that the resolution of one level is sufficient to select a unique resolution element of the next higher level of selectivity. Thus, the first Lyot filter has enough resolution to select a specific second Lyot filter mode, the second Lyot filter selects a specific etalon mode, and the etalon has enough resolution to select a specific longitudinal mode of the laser cavity.

For the system to work in an optimum way, the band-passes of these spectral filters need to be at least roughly centered on a specific cavity mode. In other words, the transmission functions of these elements overlaid with the laser longitudinal mode structure. To fulfill this goal, as an example, first, it can be assumed that the first mode to go over threshold will be the one with the highest gain which occurs around one of a series transmission peaks of first Lyot filter. Second, through the use of a temperature control means, the second filter maximum can be turned to overlap the first one by the temperature change of KTP 27 within the temperature acceptance width of phase matching, as being judged by the maximum output. Then, the frequency doubler must be seriously or actively temperature stabilized. Third, aligning the etalon transmission peak to the cavity mode is realized by the angle or the temperature tuning. A tilted etalon with an angle rotation of a few milliradian can provides enough wavelength tuning to satisfy the requirement on this purpose.

The frequency stability of such single-frequency lasers is now determined by the mechanical stability of the optical elements, the gain medium, and the resonator's superstructure. A preferred stabilization approach for the optical path length of the cavity is to choose distance holders for the cavity mirrors with a zero thermal expansion coefficient at room temperature, or to use a temperature compensation cavity structure for the compensation of the cavity length variation which is caused by the temperature change. In addition, a laser medium with a lower temperature fluctuation in optical path length is preferable to be used.

The dynamically stable single-mode operation can be accomplished by these approaches described above. The related principles are also applied for the embodiment shown in FIG. 1A above and other embodiments below. The combination of frequency-selective components of the present invention may be employed in any one of a number of different ways.

Same as before, as an alternative, in order to reduce the number of components, QWP 30 may be also made and acts functionally as an etalon. As such, the pair of QWPs 29, 30 has three functions at the same time. One is for the "twisted mode", second is for the Lyot filter, third is for instead of etalon 17. The success in such combination depends on if an appropriate trade-off can be made between the requirements on thicknesses of the QWP 30 and the etalon 17, particularly when a thick etalon is demanded. However, the trade-off is not difficult for a person skilled in the art. In addition, the effect caused by a titled etalon would be neglect when the titled angle is small enough.

On the other hand, a birefringent etalon always means that there is a common body for both functions, thus, leading to a natural tendency for two transmission peaks to overlap. However, in the present case, the common body relative to a birefringent element is separated into two parts that may causes a slight displacement between two peaks.

FIG. 1C is a folded cavity arrangement similar to that shown in FIG. 1B. There are some slight differences. A folding mirror 28 is added which is transparent for the green light so that the backward-going second harmonic beam, which is shown in a phantom arrow directed to the left side, can pass through it and the feedback effects are removed. In other words, the harmonic output occurs on both sides. And nonlinear crystal 27 moves to the left side of aperture 26 to obtain a larger space between object lens 24 and aperture 26. As an alternative, folding mirror 28 and Brewster plate 18 both can be replaced with a polarizing reflector 28.

As a further alternative, crystal 27 can be moved out from beam expander 23 and positioned after eye lens 25, then the cavity is folded between beam expander 23 and nonlinear crystal 27 and follows the way same as that shown in FIG. 2E or FIG. 8C below.

FIG. 1D is a folded cavity arrangement similar to that shown in FIG. 1C, but for the intracavity frequency mixing. It is the first embodiment for intracavity frequency mixing in accordance with the present invention. The frequency mixing between a fundamental radiation 31 and an input radiation 35 occurs in crystal 37, produces a mixing radiation output 36, and is output via a folding mirror 34. Fundamental radiation 31 is provided by laser head 11. Input radiation 35 comes in from another laser system through front mirror 32. Nonlinear crystal 37 is placed adjacent to aperture 26 for frequency mixing.

Both faces of nonlinear crystal 37 may be AR coated for radiations 31 and 35. Both mirrors 21, 32 have HR coatings for radiation 31. Front mirror 32 is transparent for radiations 35 and 36. Folding mirror 34 is HR coated for radiation 31, and transparent for radiation 36 and optionally for input radiation 35. In addition, as an alternative, the two positions between input radiation 35 and mixing radiation output 36 can be exchanged. As explained, quarter-wave plates 29, 30 and etalon 17 are applied for single-mode operation at the fundamental wavelength.

This arrangement, in fact, is a high-performance intracavity wavelength converter. It is able to produce coherent light over wide wavelength ranges, from infrared to ultraviolet. For example, in order to obtain the difference-frequency operation in mid-infrared region, radiation 31 ($\omega_1$) can be selected from 1064/1319 nm (Nd:YAG), radiation 35 ($\omega_2$) can be produced from SDL-8630 tunable laser diode, which provides 0.5 W output power within 780–1060 nm region with 25 nm tuning range. Thus, radiation 36 ($\omega_3=\omega_2-\omega_1$) operating in mid-infrared wavelengths is achieved by frequency mixing:

(780–1060) nm (SDL-8630)–1319 nm (Nd:YAG)= (1.9–5.4) $\mu$m. Correspondingly, in order to obtain a large spectral range covered by mixing radiation 36, mixing crystal 37 with a large birefringence is desired.

Similar to that mentioned in FIG. 1C, as an alternative, crystal 37 can be moved out from beam expander 23 and positioned after eye lens 25, then the cavity is folded between beam expander 23 and crystal 37 and follows the way similar to that shown in FIG. 2F or FIG. 8D below.

FIG. 2A is a cavity arrangement similar to that shown in FIG. 1B, but with an one dimensional beam expander, e. g., a prism beam expander (PBE), instead of the two dimensional beam expander. It is a variation on the first laser-cavity embodiment in accordance with the present invention.

Accordingly, a pump arrangement is shown in FIGS. 2B–D in which a gain region in the shape of a thin layer matches the cavity mode expanded in one dimension. A linear array laser-diode bar 13, such as the Spectra Diode Laboratories SDL-3470-S 20W linear array diode bar, serves as a pump source. The collimated pumping beams emitted from diode bar 13 via a collimating lens 15 are directed into laser slab 1b, resulting in a gain region 50 in the shape of a thin layer. The thickness of gain region 50 should match the TEM$_{00}$ mode size in the unexpanded dimension. As an example, the preferred size of gain region 50 is chosen to be 10 mm (long)×2 mm (height)×0.3 mm (thickness) around. Here, The height of gain region 50 must be compatible with the TEM$_{00}$ mode size in the expanded dimension so as to obtain an output beam with a circular profile.

A grating reflector 16 is placed at the opposite side of the pump face of slab 1b. It diffracts the unabsorbed pumping light back to slab 1b with a large diffraction angle so as to maximize the absorption and to optimize the uniform pump in laser slab 1b. FIGS. 2B, 2C and 2D are the top plane, front sectional and perspective views, respectively.

As an alternative, the bottom facet of laser slab 1b with HR coating at the pump wavelength can also be used as a reflecting mirror to replace grating reflector 16, but with a non-uniform pump distribution. However, it can be largely offset by a pair of diode bars 13 which are symmetrically positioned at the two opposite sides of laser slab 1b as shown in FIG. 2A.

In FIG. 2A, the left half is the pump head shown and described in FIGS. 2B–D, the right half is the rest of the resonator. The laser resonator includes a prism beam expander (PBE) 41, a pump head, a pair of QWPs 45, 46, an etalon 44, a nonlinear crystal 47, a rear cavity mirror 42, and a front cavity mirror 43 serving as an output coupler.

The pump head consists of solid-state laser slab 1b, the pair of diode bars 13, collimating lens 15 and grating reflector 16. PBE 41 consists of four prisms, preferably cut at the Brewster angle otherwise with AR coatings. Thus PBE 41 also serves as a polarizer. A laser rod can also be used instead of laser slab 1b.

Due to dispersive effects caused by the prisms, the backward-going second harmonic beam is separated and deviated from the optical axis of the laser cavity by PBE 41 effectively so that the intracavity feedback effects of the green light are naturally eliminated without a need of an extra approach. Further, multipass dispersive effects in multiple-prism systems are also incorporated, which are advantageous to obtaining narrowband laser operation. Apparently, it is not necessary for PBE 41 to be a discrete-wavelength zero-dispersion prism beam expander such as that used for pulsed dye lasers.

As to the angular wavelength tuning for etalon 44, in order to reduce the etalon walk-off loss, the rotation axis of etalon 44 should be perpendicular to the plane expanded by the prisms. The walk-off loss results from the multiple reflections within the tilted etalon that bounce laser power out of the spatial mode of the laser cavity.

The principles and related approaches described above in FIG. 1B for dynamically stable narrowband or single-mode operations and for frequency doubling are also suitable for the present case. The combination of frequency-selective components may be employed in any one of a number of different ways. The repetitious description will be avoided for simplicity.

Figure 2E:
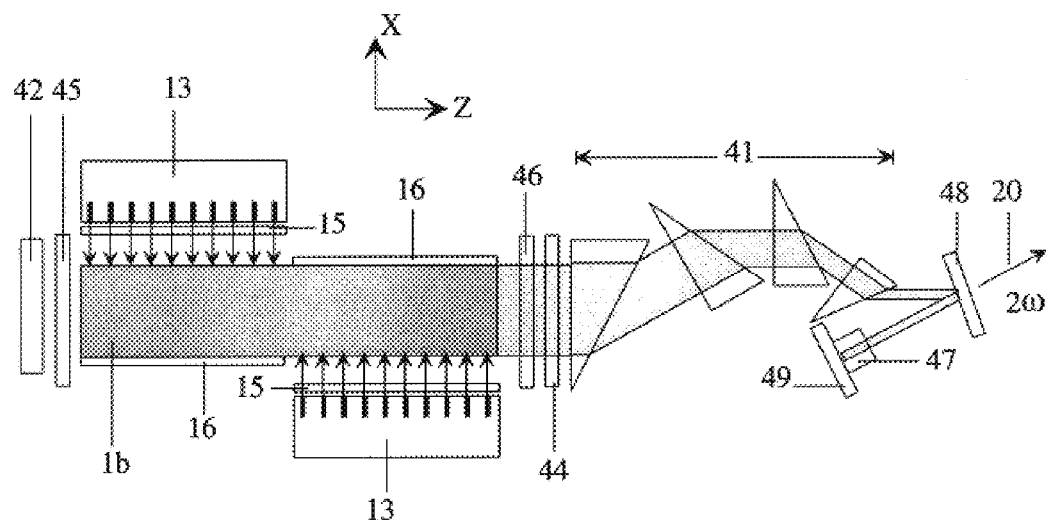
FIG. 2E shows a folded cavity arrangement with a prism beam expander for single-mode operation and intracavity frequency doubling similar to FIG. 1C and FIG. 2A.

To improve the doubling efficiency, and to obtain a uni-directional output, a folded cavity configuration, as an alternative, can also be used as shown in FIG. 2E. This arrangement is quite similar to that as shown in FIG. 1C, but the cavity is folded between PBE 41 and nonlinear crystal 47. A folding mirror 48, i.e., a dichroic mirror, is HR coated at the fundamental wavelength and transparent for the green light for the harmonic output. A cavity mirror 49 has an HR phase-preserving coating for the fundamental and harmonic radiations, and is located directly at the far end of nonlinear crystal 44 so as to largely enhance the second harmonic output. In FIG. 2E, for directness, only the relevant part of the folded cavity is presented.

In order to obtain output beam 20 with a circular profile, the height of gain region 50 and the magnification of PBE 41 should be selected appropriately with respect to each other. In a folded cavity, this can be done in another way. A curved mirror can be used for folding mirror 48 which will effectively offset an elliptical beam to a circular beam and contribute a well stable cavity design.

Figure 2F:
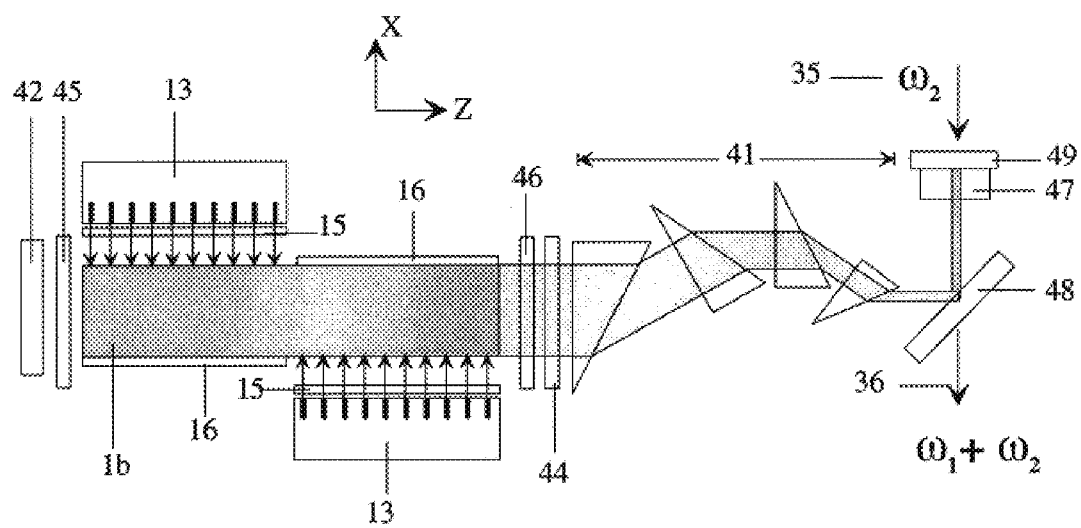
FIG. 2F shows a folded cavity arrangement for intracavity frequency mixing similar to FIG. 1D, but with a prism beam expander. It is the second embodiment for intracavity frequency mixing in accordance with the present invention.

FIG. 2F shows a folded cavity arrangement for intracavity frequency mixing similar to that shown in FIGS. 1D and 2E. It is the second embodiment for intracavity frequency mixing in accordance with the present invention. Similarly, a cavity mirror 49 may have an HR phase-preserving coating for the fundamental and mixing radiations, and is located directly at the far end of nonlinear crystal 47 so as to largely enhance the mixing radiation output. The redundant description will be avoided for simplicity.

Part II Pump Heads for Producing Thin Gain Zone FIGS. 3A–F to FIGS. 7A–D

In this part, two steps, a pump head with a thin gain zone and an approach for the pre-narrowband operation, are advanced to obtain single-mode or narrowband operation. These two steps are discovered in the original patent of U.S. Pat. No. 5,515,394 (1996).

Since the spatial hole-burning effect is minimized by using the pump head with a thin gain zone rather than the "twisted mode," the cavity arrangements shown in FIGS. 1A–D are now able to be further simplified by eliminating the use of the two QWPs, as shown below in FIGS. 8A–D. In other words, the cavity arrangements of the two sets, in FIGS. 1A–D and in FIGS. 8A–D, are almost the same while the pump heads of the two sets are different.

In the first step for a pump head, when a thin gain zone is created adjacent to a cavity end mirror in a homogeneously broadened solid-state laser medium, the cavity modes overlap spatially within the thin gain zone so as to compete for the available gain leading to minimizing or eliminating the spatial hole-burning effect. In the case of a pump head with a thin gain zone, the corresponding spectral oscillating mode interval under laser operation is largely dominated by the thickness, denoted by $\Delta T$, of the thin gain zone along the optical axis of the laser cavity.

When the thickness $\Delta T$ is small enough so that the oscillating mode interval is larger than the FWHM of the lasing bandwidth of the gain medium, single-mode operation occurs directly. When the thickness $\Delta T$ is not small enough, a multimode operation with a much larger oscillating mode interval arises. In fact, this effect caused by a thin gain zone here is equivalent to that caused by short cavity configurations in which spectral modes are separated substantially.

Consequently, in the second step for the so-called pre-narrowband approach, the required resolving-power of a frequency-selective form is largely relaxed in realizing single-mode operation as compared with the situation dominated by the spatial hole-burning effect. A spectral filter with a lower resolving-power usually leads to a lower insertion loss, thus resulting in a key advantage for overcoming the dominant difficulty in the prior art. In order to distinguish a narrowband operation under such situation from the regular one, this approach, therefore, is called the pre-narrowband approach or the pre-narrowband operation in the present invention.

As to the first step, in order to produce a thin gain region at the end of a solid-state laser medium, or within a small chip of a solid-state laser medium, several approaches with different pumping schemes have been developed in the present invention. They are projected as follows.

The simplest technique is to use the end-pumping scheme to produce a thin gain region, including the off-axis end-pumping geometry. But this allows few options. Essentially only one approach can be followed for such pump arrangement. That is, a laser medium with a large absorption coefficient at the pump wavelength is end-pumped resulting in a very short absorption depth at the end of laser medium so as to produce a thin gain region. This method was used by G. J. Kintz and T. Baer in their paper of IEEE J. QE-26 (1990)9, 1457. In addition, the thickness of the laser medium along the optical axis of the laser cavity may be 1 mm around or less to facilitate this goal at the sacrifice of pumping power and cooling rate.

Several approaches with different pump-light delivery optics can be applied to deliver high diode power to the pump region with the end-pumped type. One example is to use the combination of the lens duct and cylindrical microlenses as reported by R. Beach et al., CLEO'93, CFM6, p.644. Another example is to use the fiber-optic coupler or a bundle of fibers, as described by Graf and Balmer, Opt. Lett. 18(1993)1317 and by Kaneda et al., Opt. Lett. 17(1992)1003.

The end-pumping scheme is not only limited by the need of a laser medium with a small thickness and a very large absorption coefficient, but also suffers from the loss of pump power and thermal problems in scaling to higher pump levels. To overcome these drawbacks, the following novel side-pumping approaches in FIGS. 3A–F, FIGS. 5A–E and FIGS. 6A–E are introduced.

FIGS. 3A–D show a disk-waveguide pump head with side-pumped type, in which a disk-waveguide assembly is pumped by fiber bundles from three directions to produce a thin gain region. This is the first pump embodiment in accordance with the present invention. As an important feature, a regular laser material, such as Nd:YAG and Nd:YLF, can be used. A laser medium with a large absorption coefficient is no longer required due to a multipass geometry for the pumping beams.

A small chip of a solid-state laser medium 1c is surrounded by a pump cladding 3 in the form of a circular plate. As the convergent nature of a circle geometry reflector, the outside of pump cladding 3 has an HR coating 4 circlewise at the pump wavelength so that the pumping beams, once entering, undergo multiple reflections and multiple passes through laser chip 1c until they are completely absorbed. An AR-coated or un-coated slit 5, i.e., the spectral opening, serves as an entrance for the pumping beams. A fiber bundle 8 which is used for delivering the pumping beams from diode bars, is butt-coupled to slit 5.

The thickness of solid-state laser chip 1c and pump cladding 3 along the Z direction is selected preferably but not necessarily to be the same, such that due to total-internal-reflection, the pumping beams are confined between the two surfaces of the circular plate which acts as a planar waveguide. In other words, a disk plate formed by laser chip 1c and pump cladding 3 actually become a multipass disk-waveguide, or container-like disk, or disk-blackbody. As an alternative, when the absorption loss within a unpumped volume is small, the extent at one end of laser chip 1c in the Z direction may be selected to be longer than that of pump cladding 3, so that the unpumped volume is able to serve as a heat sink to facilitate heat dissipation. And there would be a small escape loss of pump energy from the disk-waveguide by leakage out through the end of laser chip.

Figure 3A:
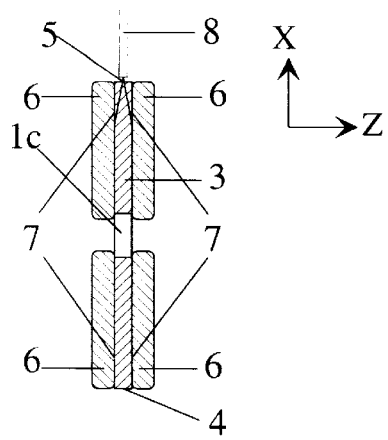
FIGS. 3A, 3B and 3C are, respectively, the front sectional, perspective and side sectional views of a disk-waveguide pump head, and it is used for pumping a laser chip surrounded by a pump cladding. The disk-waveguide assembly is pumped by fiber bundles from three directions to produce a thin gain region within the laser chip. This is the first pump embodiment in accordance with the present invention.
Figure 3B:
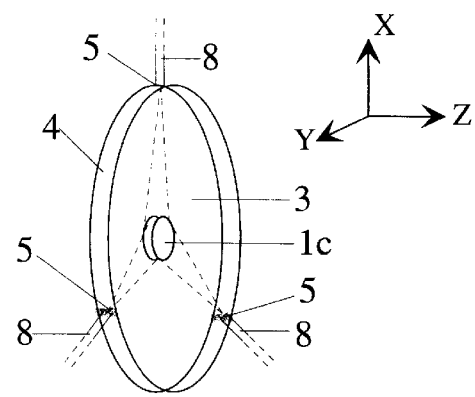
Figure 3C:
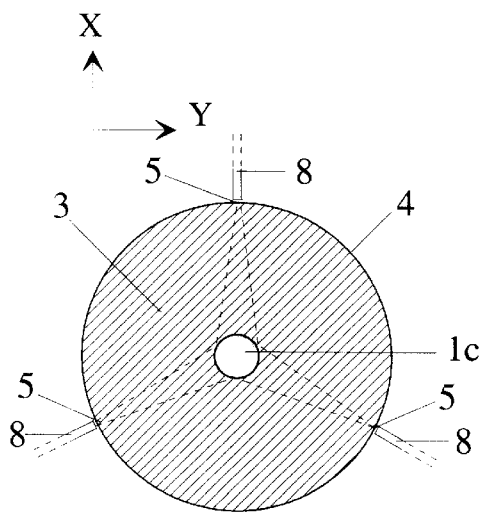
Figure 3D:
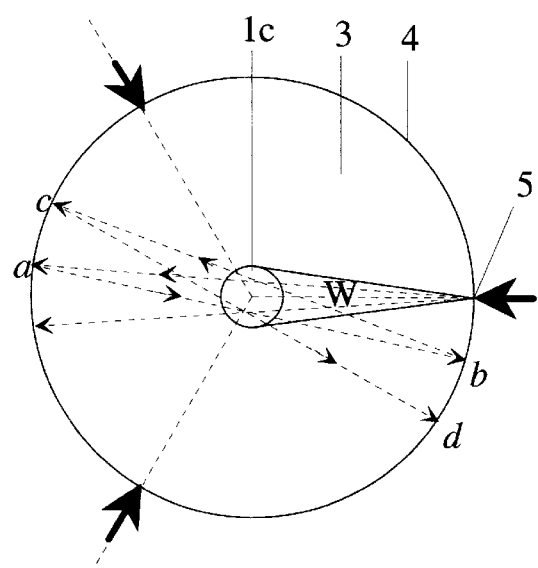
FIG. 3D is a geometric optics illustration for FIGS. 3A–B. The multi-reflected pump light multipasses through a gain medium at the center of a disk-waveguide.

The situation of the multi-reflection and multipass geometrical path for the pumping beams is diagrammed in FIG. 3D. Once entering slit 5, the pumping beams restricted within the planar disk-waveguide are repetitively reflected by outside coating 4 of pump cladding 3 at points a, b, c, d and so on in turn, and therefore allowing pumping beams to multipass through laser chip 1c for maximum absorption.

In order to work well for such a disk-waveguide pump head, the design parameters must be selected properly. The diameters of circular fiber bundle 8, laser chip 1c and pump cladding 3 are denoted by d, D, and $\Phi$, respectively. In the plate plane, the half-angle of the acceptance cone of the disk for the pumping beams outputed from fiber bundle 8 can be estimated as $$\alpha = \tfrac{1}{2}\Omega = \beta \tan^{-1}(D-d)/\Phi$$

where the half-angle is denoted by $\alpha$, the acceptance cone is denoted by $\Omega$, and parameter $\beta$ in a selected range from 0.9 to 0.5 around is denoted as the acceptance index. Obviously, here $\alpha$ or $\Omega$ is directly proportional to D, and inversely proportional to $\Phi$.

As the diameter d of circular fiber bundle 8 is chosen to be 500 um or less, or equal to ($\tfrac{1}{4}$–$\tfrac{1}{6}$)D around, and the size of slit 5 is appropriately larger than the size of fiber bundle 8 so as to relax alignment tolerances, the escape loss of the pumping beams from slit 5 is less than 10%, typically less than 5%. The diameter D of solid-state laser chip 1c is selected from a range around 0.2–3 mm, which depends on the consideration of the mode-matching and power level condition. The choice of the diameter $\Phi$ of pump cladding 3 is dependent on the diameter D of solid-state laser chip 1c and the numerical aperture of fiber bundle 8. When the diameter D is close to or less than 1 mm, the graded- or step-index configuration is preferably used which will be given shortly.

In the plane perpendicular to the disk plane, the acceptance cone of the disk for the pumping beams has much larger tolerance and would not have a problem. The thickness $\Delta T$ of the thin gain region now is defined by the thickness of the disk plate, which is preferably constructed to be around 0.2–2 mm, typically 1 mm.

On the other hand, the fiber bundle plays an important role in the present pump arrangement. Fiber optics is a well-developed technology capable of low-loss transport of diode laser output. The pumping beams outputed from the end of fiber bundle 8 need to fit within the region of the acceptance cone $\Omega$ as shown in FIGS. 3B–D. In other words, the exit cone of fiber bundle 8 needs to match the acceptance cone $\Omega$. In order to obtain a better result, the numerical aperture, i.e., the N.A, of fiber bundle 8 must be selected as low as possible. Considering the practicability and commercial availability, a low N.A. of around 0.1 is demanded.

A low N.A. fiber bundle and a collimating lens constitute a fiber-optic coupler for coupling the output from a diode bar. The relevant technologies were reported by Baer et al. in U.S. Pat. No. 5,127,068 (1992) and others. The radiation of a diode bar is focused into an array of fibers via a collimating lens. The collimation is performed in the fast axis of the diode. The N.A. of the butt coupled fiber is chosen to be roughly equal to the low N.A. direction of the diode. At the rear end of the coupler, the fibers are joined to a bundle.

Fiber bundle 8 may have a circular profile with circular cored fibers, or noncircular profile with circular or noncircular cored fibers, such as a rectangular profile with rectangular cored fibers. The later is preferred because the noncircular cored fiber can better match the linear emitting area of the diode laser and a rectangular slit 5. As an alternative, a fiber bundle with a single fiber of a low N.A. can also be used here.

On the other hand, apparently, in favor of the pumping and laser operation, the pump cladding is transparent at both the pump and fundamental wavelengths and its refractive index should be the same as or close to that of the gain medium. A proper index-matching material may be used between them for the joint. To serve this purpose, an option to build a pump cladding is that an active material as dopant is only doped within a small center area of the host material, therefore, the undoped outside section becomes a pump cladding.

A heat sink 6 are bonded to one or two sides of the peripheral section of pump cladding 3, favorable to uniform temperature distribution and heat dissipation. In order to support the disk-waveguide pump head, apparently, the heat sink can be made as the pedestal or part of the pedestal, which mounted and bonded evenly to the outer section of one side of the pump cladding. Then the heat within the heat sink can be dissipated via coolant or TE cooler.

In order to maintain total-internal-reflection within the bonding area, an metal foil 7, such as an aluminum or silver foil, needs to be inserted between pump cladding 3 and cooler 6. When an optical boundary surface of an optical element is used under the condition of total-internal-reflection and in the cases where the surface is contacted with other substances, this approach can significantly be employed to protect the gas-solid or liquid-solid interface from the so-called "Frustrated Total-Internal-Reflection".

Other methods also can be applied, including i) inserting a thermal film with a lower refractive index than pump cladding 3 between pump cladding 3 and cooler 6 within the bond area; ii) filling up a thermal material with a lower refraction index than pump cladding 3; and iii) the surface of pump cladding 3 or cooler 6 within the bond area may be HR coated at the pump wavelength to reflect the pumping beams.

In FIGS. 3A–D, as an example, three fiber bundles are arranged circularly for 3-side pumping of the disk-waveguide in the case of solid-state laser chip 1c with a circular shape. However, the precise geometric shape of laser chip 1c can vary widely. Also, the number of the fiber bundles and the related arrangement may be employed in any one of a number of different ways.

FIGS. 3A, 3B and 3C are the front sectional, perspective and side sectional views, respectively, in the case of 3-side pumping. FIG. 3D shows the multipass geometrical path of pumping beams within a disk-waveguide.

As a significant alternative, in order to obtain a large acceptance cone, the above disclosed disk-waveguide can be made using the method used for graded-index optics, such as a GRIN fiber or lens. That is, pump cladding 3 has a variable refractive index that is a continuous function n(r) of the radial distance r from the disk center, the refractive index getting progressively lower away from the center. This characteristic causes the pumping beams to be continually refocussed by refraction into the center area, and then to be multi-reflected and to multipass through the gain medium along a diameter repetitively until they are completely absorbed. In order to facilitate the ray centering process and avoid a possible helical ray track, the rate of change of the amount of the refractive index, i.e., dn(r)/dr, should be designed properly.

Similarly, pump cladding 3 can be also constructed to have two sleeves with different refractive indexes similar to a way used for step-index fibers. The inner sleeve has the same refractive index as that of laser chip 1c. The outer sleeve has a lower refractive index. Therefore, a lens effect caused by the difference of refractive indexes between them strongly converges the pumping beams and, by appropriate choice of parameters, results in a large acceptance cone. Here, as a primary consideration, the thickness of the outer sleeve along the radial direction is expected to be approximately equal to the focus length caused by the lens effect. In such a case, the related acceptance cone Ω becomes $$\alpha = \tfrac{1}{2}\Omega \sim \beta \tan^{-1} D'/\Phi$$

where now D' is the diameter of the inner sleeve of the pump cladding rather than that of the laser chip.

Thus, in the above two cases when using a graded-index disk-waveguide or step-index disk-waveguide, fiber bundles with a large N.A. or commonly-used pumping coupling optics can be employed for delivering pumping beams, or even a laser diode can be directly butt-coupled to slit 5, leading to a much simpler and cost-effective structure. FIGS. 3E and 3F show the side sectional views of a graded-index disk-waveguide pump head and a step-index disk-waveguide pump head, respectively.

As an option, a Selfoc lens serving as an interfacing optics may be applied between slit 5 and the end of fiber bundle 8 or pumping coupling optics. In addition, a interfacing optics may be used in setting fiber bundle 8 or pumping coupling optics perpendicular to the disk plate for a compact package.

In conclusion, using a disk-waveguide, the pumping power from the diode bars can be concentrated within a regular solid-state laser material of a small volume around or less than 1 mm³. A pump head of a size like a dime or quarter which is capable of producing a stable high power green light or even UV light now is practicable and will be sampled shortly below in FIGS. 8A–D, 9, and 10.

As a straightforward and significant extension, the present pump approach with the above multipass pumping geometry can significantly be employed for the utility of pumping a regular solid-state laser rod or bar, as shown in FIGS. 4A–F. In such a case, a number of disk-waveguide can be stacked together to construct a multipass cylinder reflector or a cylinder-blackbody for pumping laser rod/bar 1a.

In FIGS. 4A–B, correspondingly, every fiber bundle 8 in FIGS. 3A–C is replaced by a 10–20 W linear array laser diode bar 13 combined with a collimating rod lens 15 identical to that shown in FIGS. 2B–C above. Laser diode bar 13 via rod lens 15 is butt-coupled to a stripe entrance 5. The stripe width is less than 500 um typically. In view of that the divergence of the pumping beams within the XY plane after collimation can be less than one degree, thus the diameter/size of laser rod/bar can now be selected as small as around 0.3–1 mm to satisfy the condition of $$\alpha = \tfrac{1}{2}\Omega = \beta \tan^{-1}(D'/\Phi),$$

so as to greatly facilitate mode-matched pumping. Here D is the diameter of laser rod 1a, and Φ is the diameter of cylinder reflector 10. FIGS. 4A and 4B are the side sectional and perspective views, respectively.

Apparently, a graded-index pump cladding is preferable to be used to obtain a large acceptance cone. The pumping beams, once entering, are continually refocussed by refraction into the center area for pumping solid-state laser rod or bar 1*a*. In this situation, the construction of a multipass cylinder reflector is about the same as a section of a graded-index fiber.

Similarly, pump cladding 3 can be also constructed to have two sleeves with a step-index. The inner sleeve has a refractive index same as that of laser rod/bar 1*a*. The outer sleeve has a lower refractive index appropriately. Therefore, a lens effect caused by the difference of refractive indexes between them strongly converges pumping beams resulting in a large acceptance cone. As mentioned before, as a primary consideration, the thickness of the outer sleeve along the radial direction is expected to be approximately equal to the focus length caused by the lens effect. Thus, in the above two cases, linear array laser diode bar 13 can directly be butt-coupled to stripe entrance 5 without collimating lens 15. Then, a multipass cylinder reflector becomes a multipass graded-index or step-index cylinder reflector and its performance is largely enhanced. FIGS. 4C and 4D show the side sectional views of a graded-index cylinder reflector pump head and a step-index cylinder reflector pump head, respectively.

As for thermal managements, various cooling and temperature control systems are well known in the art and are widely available. In an exemplary configuration of the preferred embodiment, passageways for coolant flow can be provided through a monolithic housing structure in direct contact with the laser rod, as described by H. Bruesselbach and D. S. Sumida in their paper "69-W-average-power Yb:YAG laser," Opt. Lett. 21 (1996)7, p.480, or by P. A. Bournes in his U.S. Pat. No. 5,287,371 and by E. A. Stappaerts et al. in their U.S. Pat. No 5,307,365.

The pump cladding has a hole to provide a tubular sleeve. The sleeve surrounds the laser rod and forms a passageway through which the coolant flows in direct contact with the rod for efficient absorption of the heat generated within the rod. Such a structure is not shown in FIGS. 4C and 4D as well as later other relevant drawings for simplicity. The cross-section and size of the hole, the radial extent of the coolant channel and the refractive index of the coolant need to be selected properly to facilitate the pumping process and effective cooling. Holes may have a circular cross-sectional outline, or noncircular cross-section, such as rectangular. Coolant may be either liquid or gas, in accordance with the requirements of the particular application for laser system.

While the above described cooling approach can be called as the Direct Cooling Approach, on the contrary, when the cooler or coolant temperature is low enough and the pump cladding has a good thermal conductivity and its size is not too large, as an alternative, the heat can be dissipated via the pump cladding then into coolant or TE cooler. And such cooling approach can be denoted as the Indirect Cooling Approach.

In the case of the step-index pump head, as an alternative, the outer sleeve can also be made from the coolant fluid as shown in FIG. 4E which is the side sectional view. A cylinder reflector 10 is made as a hollow cylinder with a cylindrical envelope whose inside or outside is HR coated at the pump wavelength with a few AR-coated or un-coated stripes, i.e., spectral opening, serving as pump entrances. A regular laser rod/bar 1*a* with a small diameter/size surrounded by a pump cladding 3 is mounted at the center of the hollow cylinder. The inside of the cylindrical envelope should be filled with a proper fluid for forming the step-index structure and for cooling. For the pump head to work in an optimum way, the diameters of cylinder reflector 10 and pump cladding 3 as well as the refractive index of the fluid must be selected properly. A graded-index pump cladding may also be used instead of the regular one.

For example, to construct a hollow cylinder reflector pump head, a laser rod/bar has a diameter/size of 0.5–1 mm around, the diameter of a cylinder pump cladding is 5–15 mm around, and the diameter of a cylinder reflector can be selected from a large range, such as from 10 mm to 40 mm around. Once again, as a primary consideration, the space between the cylinder pump cladding 3 and cylinder reflector 10 is expected to be approximately equal to the focus length caused by the lens effect.

In the prior art, side-pumping geometries put very stringent requirements on the diode wavelength tolerance in the use of regular laser materials because of the short absorption lengths available. The absorption efficiency is seriously limited. Beam quality can also be negatively impacted because of axially asymmetric gain profiles that can be imprinted on the output beams. Now, these historic problems relative to side-pumping scheme have been successfully solved with the use of the above multipass reflector pump heads.

Next, as an alternative of the disk-waveguide pump head shown in FIGS. 3A–D, a disk-waveguide and the like without outside coating can be also applied as long as solid-state laser chip 1*c* has a large absorption coefficient. Accordingly, FIGS. 5A–E show a side-pumped arrangement almost the same as that shown in FIGS. 3A–D, except pump cladding 3 may have a circular or noncircular shape and its outside no longer needs to be HR coated at the pump wavelength. Fiber bundle 8 with a rectangular profile is shown.

FIGS. 5A, 5B and 5C are the front sectional, perspective and side sectional views, respectively, in the case of 4-side pumping and when both pump cladding 3 and solid-state laser chip 1*c* have a square shape.

FIG. 5D is the side sectional view in the case of 4-side pumping and when pump cladding 3 has a square shape and solid-state laser chip 1*c* has a circular shape.

FIG. 5E is the side sectional view of a similar pump arrangement with 2-side pumping. In this pump arrangement, a solid-state laser slab 1*b* is sandwiched by two pieces of pump cladding 3.

The consideration of the related design parameters for the embodiment set forth in FIGS. 5A–E is similar to and easier than that discussed in FIGS. 3A–D. The repetitious description will be avoided for simplicity.

FIGS. 6A–C show a side-pumped arrangement which produces a thin gain region at the end of a solid-state laser bar. This is the second pump embodiment in accordance with the present invention. Four shaped pumping beams 9 impinge on the end of a solid-state laser bar 1*a*, adjacent to an end cavity mirror from four different directions of the top, right, bottom and left, so as to produce a thin gain zone 2.

The cross section of solid-state laser bar 1*a* perpendicular to the optical axis of the laser cavity is square-shaped with a side length denoted by L. On the other hand, two dimensions are denoted by size E and F of the cross section at the end of shaped pumping beams 9. The size E should be constructed to define the required thickness ΔT of thin gain region 2, and size F should match the parameter L.

It is not very difficult to control size E to around 0.3–0.5 mm and size F to around 3–5 mm with laser diode bars by using common optics; an example is shown below in FIGS. 7A–D shortly. In fact, in general speaking, to serve the present purpose, any end-pumping scheme can become a side-pumped type so long as it is rotated 90° totally.

Therefore, a beam-shaping optics, i.e., a pumping coupling optics, and a relevant arrangement can vary widely and may be employed in any one of a number of different ways.

Such as i) a fiber-optic coupler and imaging telescope; ii) a fiber-optic coupler and a Selfoc lens; iii) the beam shaping optics used by Wallace et al., Optics Lett 16(1991)318, in which size E and F were controlled around 0.15 mm and 1.1 mm respectively when using a single 10 W linear array laser-diode bar; iv) the beam shaping optics used by Brown et al., CLEO'93, CFM7, p.644, in which size E and F were controlled around 0.3 mm and 1.6 mm (FWHM), respectively; and v) the lens duct and fiber lens used by Beach, Laser Focus World, March 1994, p.20, in which input pumping beams can be spatially focused to spot sizes down by a factor of 100 times.

FIGS. 6A, 6B and 6C are the front sectional, front perspective and side sectional views in the case of using laser bar 1a, respectively. The shaped pumping beams 9 are in the XY plane.

As an alternative, the solid-state laser rod with a diameter L can be used instead of solid-state laser bar. FIGS. 6A and 6D are the front sectional and side sectional views in the case of using laser rod 1a, respectively.

FIGS. 6A–D have shown 4-side pumping; as alternatives, one-side, 2-side, or 3-side pumping may also be applied for the present purpose. In that case where pumping beams are arranged symmetrically from two opposite sides, and in order to concentrate the pump power in the central lasing area of laser bar 1a, an optimized absorption coefficient at the pump wavelength can be chosen to be the value, which leads to I(L)/I(0)=6%–13% around and results in absorption efficiency over 80%. Here I(0) is the incident light intensity and I(L) is the intensity of the light emerging from the other side of laser bar with the path length L. For example, when size L is small, such as around 1 mm, the related absorption coefficient would be as high as around 22 cm$^{-1}$ to satisfy an optimal condition and to maximize absorption efficiency.

As an alternative, in the case of uneven one-side or 2-side pumping, in order to maximize absorption efficiency, a laser medium with a very large absorption coefficient, such as 70 cm$^{-1}$, must be employed. Otherwise, a blazed grating reflector is optionally placed on the opposite side of the pump face for diffracting the unabsorbed pumping beams back to laser medium with a large diffraction angle to maximize the absorption and to facilitate the realization of a uniform pump. Further, the facets on the other side of the laser medium may have HR coating at the pump wavelength to confine the diffraction beams. As an alternative, the opposite side of the pump face can be HR coated as a high reflector mirror instead of using the grating reflector. These two concerns are also appropriate for the pump embodiment set forth in FIGS. 5A–E.

FIG. 6E is the side sectional view of a similar pump arrangement with 2-side pumping, in which a solid-state laser slab 1b is sandwiched by two pieces of pump cladding 3.

In FIGS. 7A–D, as an example, the pumping beams are emitted from 2-D stacked laser diode bar and shaped by using common optics. The collimated pumping beams 51 emitted from 2-D diode bar 14 via a collimating lens 15 are tightly focused by a lens or lens set 52, then become the shaped pumping beams 9 with a desired size at a focus spot 53.

FIGS. 7A and 7B show the front and top plane views, respectively. FIG. 7C is a magnified sectional view of focus point 53, whose cross section has two dimensions denoted by E and F as was mentioned above in FIGS. 6A–E. Size E defines the thickness ΔT of a thin gain region and usually controlled to be around 150–500 um. Size F is related to the size of a pumped area within a laser rod or laser bar, and has a much larger tolerance than size E. Size F usually is controlled to be around 1–5 mm and dependent on the cavity mode volume and power levels. FIG. 7D is a magnified sectional view of a single layer structure in 2-D diode bars 14 with a relevant collimating lens 15.

The output of each tier in the 2-D diode bar 14 is collimated by collimating lens 15, preferably a fiber rod lens array, which is mounted parallel to and in a certain spaced relation with one emitter tier of diode bar 14 by precision spacer means. The arrays in 2-D diode bar 14 and fiber rod lens array 15 matched to each other geometrically in a one-to-one manner by tiers. The diameter of fiber rod lens 15 and its refractive index are chosen correctly for collimating. The compilation of collimated pumping beams 51 is directed toward lens or lens set 52.

Here fiber rod lens array 15 serves as a one-dimensional collimating lens to collimate the beam divergence in the plane perpendicular to the diode junction plane. On the other hand, the beam divergence in the plane parallel to the diode junction plane is relatively small around 5°–10°.

As an alternative, a microlense array serving as a two-dimensional collimating lens can be used instead of fiber rod lens array with a much better result for size F. Further, the combination of several linear array laser-diode bars can be used as the pump source instead of the 2-D stacked laser-diode bars.

Finally, as pump absorptions of some solid-state laser materials are strongly depend on the polarization direction, the pump polarization needs to be oriented or adjusted by a half-wave plate to ensure the strong pump absorption in such case.

Part III Using Thin Gain Zone for SLM Operation with SHG FIGS. 8A–D to FIG. 9

The pump heads with a thin gain zone have been built successfully in FIGS. 3A–F, FIGS. 5A–E and FIGS. 6A–E. As mentioned at the beginning of this section, they enable the cavity arrangements shown in FIGS. 1A–D to be further simplified to those indicated in the following FIGS. 8A–D, since it is no longer necessary to use a pair of quarter-wave plates to perform the "twisted mode" operation for minimizing the spatial hole-burning effect. In fact, the cavity arrangements of the two sets are almost the same whereas pump heads of the two sets are different.

Once again, as was described above in FIGS. 1A–D for dynamically stable narrowband operations and for frequency doubling and mixing, as well as in FIG. 2E for a folded cavity, the principles and related approaches are also suitable for the present cases in FIGS. 8A–D. The combination of frequency-selective components may be employed in any one of a number of different ways. The repetitious description will be avoided for simplicity.

For single-mode or narrow-band operation, when the thickness ΔT is controlled to be less than $\lambda^2/k(FWHM)$, the single-mode operation may be directly obtained without using the pre-narrowband approach. Here, λ is the lasing wavelength, the FWHM is the lasing bandwidth of the gain medium. The range of the parameter k is around 5 to 10. This value is dependent on the power level, the linewidth and polarization of the pumping light. As an example, while the FWHM is 1 nm, the thickness of a thin gain zone must be controlled to be about a few hundred micrometers. When the thickness ΔT is not small enough, or the FWHM of the lasing bandwidth is too large to satisfy the requirements above, a multimode operation, which has a much larger oscillating mode interval than the free spectral range of the laser cavity, occurs instead of single-mode operation. In such cases, it is necessary to use the pre-narrowband approach for attaining single-mode or narrowband operation.

Figure 8B:
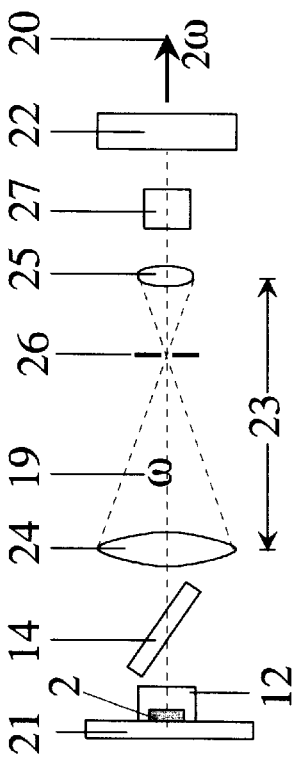
FIG. 8B is a cavity arrangement for single-mode operation and intracavity frequency doubling similar to FIG. 8A except that a Brewster plate is used instead of the etalon.
Figure 8D:
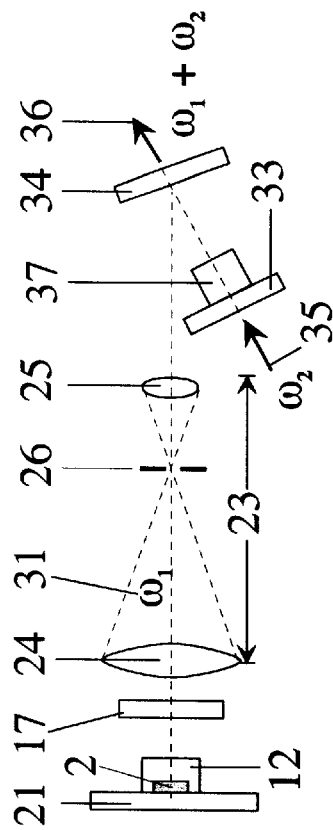
FIG. 8D is a folded cavity arrangement for the intracavity frequency mixing similar to that shown in FIGS. 8C and 1D. This is the third embodiment for intracavity frequency mixing in accordance with the present invention.
Figure 8A:
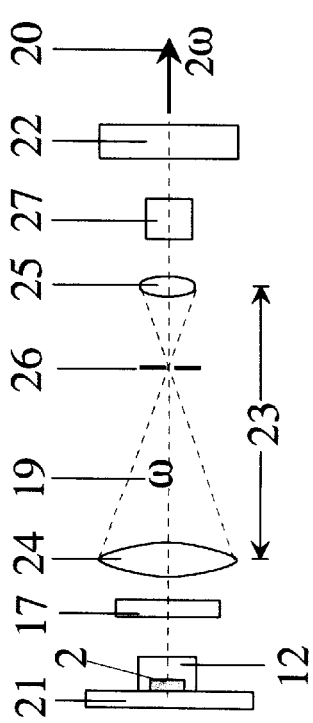
FIG. 8A shows a cavity arrangement for single-mode operation and intracavity frequency doubling similar to that shown in FIG. 1A, except that a pump head with a thin gain zone is applied instead of the two QWPs for minimizing the spatial hole-burning effect. This is the second laser-cavity embodiment in accordance with the present invention.

FIG. 8A shows a cavity arrangement for single-mode operation and intracavity frequency doubling similar to that shown FIG. 1A, except that a pump head 12 with a thin gain zone 2 is applied instead of the two QWPs. This is the second laser-cavity embodiment in accordance with the present invention.

The rear optical facet of the laser medium and pump cladding within pump head 12 may be coated at the fundamental wavelength instead of rear cavity mirror 21. As the pre-narrowband approach, an etalon 17 is inserted. However, compared with the situation dominated by the spatial hole-burning effect, etalon 17 here has a much lower finesse leading to a much lower insertion loss.

In this case, there are two points worthy to be mentioned. First, it is not necessary to keep nonlinear crystal 27, even in the case of using type-II doubling, as a full- or half-wave plate at the fundamental wavelength with serious temperature control. Second, a laser medium with the exhibition of birefringences is not forbidden. This is in contrast to the prior art "twisted mode" operation. Obviously, these two advantages are very important and unique as compared with other designs in the prior art.

FIG. 8B shows a cavity arrangement for single-mode operation and intracavity frequency doubling similar to FIG. 1B, except that a pump head 12 with a thin gain zone 2 is applied instead of the two QWPs; or similar to FIG. 8A except using a Brewster plate instead of the etalon. As an option, etalon 17 or a birefringent etalon may be inserted if required.

Figure 8C:
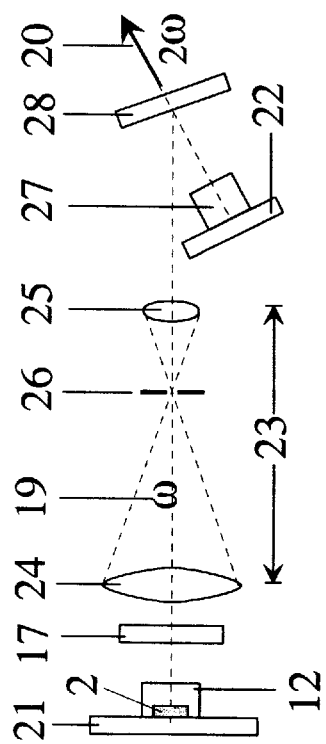
FIG. 8C is a folded cavity arrangement for single-mode operation and intracavity frequency doubling similar to FIGS. 8A–B but with more than one level of frequency selectivity.

FIG. 8C shows a folded cavity arrangement for single-mode operation and intracavity frequency doubling similar to FIGS. 8A–B but with more than one level of frequency selectivity; or similar to FIG. 1C, except i) pump head 12 with a thin gain zone 2 is applied instead of the two QWPS, ii) nonlinear crystal 27 moves out from beam expander 23, and iii) the cavity is folded between beam expander 23 and nonlinear crystal 27. The rest is as same as what has been mentioned in FIGS. 1B, 2E and 8B, thus, the redundant description will be avoided for simplicity.

FIG. 8D shows a folded cavity arrangement for intracavity frequency mixing similar to FIG. 8C; or similar to FIG. 1D except that a pump head 12 with a thin gain zone 2 is applied instead of the two QWPs. This is the third embodiment for intracavity frequency mixing in accordance with the present invention. Similar to that mentioned in FIG. 2F, a cavity mirror 33 may have an HR phase-preserving coating for the fundamental and mixing radiations, and is located directly at the far end of nonlinear crystal 37 so as to enhance the mixing radiation output. The redundant description will be avoided for simplicity. Further, the approach of the resonantly enhanced input may be applied for radiation 35. In such a case, when etalon 17 is inserted, it needs to be AR coated (T>99.5%) for input radiation 35. This is realistic due to its low finesse at the fundamental wavelength.

All of the above mentioned cavity arrangements in FIGS. 1A–D, FIGS. 2A–F and FIGS. 8A–D are required to insert a beam expander. Now, finally, as a further alternative, the simplest cavity arrangement for obtaining single-mode operation with a regular standing-wave cavity for solid-state lasers in the present invention is an exception as shown in FIG. 9.

FIG. 9 shows a cavity arrangement for single-mode operation and intracavity frequency doubling similar to FIG. 8C, except that this arrangement does not have a beam expander and etalon. This is the third laser-cavity embodiment in accordance with the present invention.

A conventional stable resonator, consisting of a rear mirror 61, a cavity mirror 62 and a folding mirror 63, can be applied. A pump head 12 with a thin gain zone 2 is positioned adjacent to rear mirror 61. The rear optical facet of the laser medium and pump cladding within pump head 12 may be coated at the fundamental wavelength instead of rear cavity mirror 61.

As the pre-narrowband approach, a Brewster plate 18 is inserted and combined with a type-II doubler 64, preferably KTP, to form a birefringent filter. When the thickness ΔT of thin gain zone 2 is small enough, a birefringent filter can provide a necessary frequency-selectivity with substantially less excess loss than that of an inserted etalon in obtaining single-mode operation. This is a key concern in the case of a cavity without a beam expander.

As previously stated, folding mirror 63 serving as an output coupler is HR coated at the fundamental wavelength and transparent for the green light for the harmonic output. Cavity mirror 62 has HR phase-preserving coating for the fundamental and harmonic radiations, and is located directly at the end of nonlinear crystal 64 so as to largely enhance the second harmonic output.

In order to offer a relative larger mode size for pump head 12 and Brewster plate 18, cavity design parameters need to be selected properly. Both rear mirror 61 and folding mirror 63 may be a large-radius mirror or flat mirror, and cavity mirror 62 is a short-radius mirror. Or, cavity mirror 62 is a flat mirror and, a curved mirror with a short-radius may be used for folding mirror 63 that gives a simple self-aligning cavity design.

Part IV Intracavity Frequency Conversions FIG. 10

After successfully solving the "green problems" for the intracavity second harmonic generation (SHG) and obtaining stable green light, a similar exercise can significantly be extended and applied to intracavity higher order harmonic generations.

Intracavity third and fourth harmonic generations (THG and FHG) with using two or three nonlinear crystals, can directly and effectively produce CW UV output from one single cavity. They offer a much more attractive solution than the external resonant cavity frequency doubling technology in the art. In fact, intracavity THG and FHG technologies with all of its inherent difficulties have been usually recognized to be practically impossible before.

Beam expanding cavities (BEC) in the present invention provide two important functions for intracavity THG and FHG. First, the BEC provides high power mode-matched pumping operation at the fundamental wavelength. Second, the BEC, in the unexpanded beam portion, provides a long and stable, smaller beam waist for efficient intracavity frequency conversion while avoiding optical damage and resulting in an optimum condition for the use of two or three separated nonlinear crystals positioned serially.

On the basis of SHG technology, intracavity higher order harmonic generations is projected as follows. In the THG process the THG crystal sums the two radiations of the fundamental and second harmonic. The high intensity of the fundamental allows for efficient THG. The same situation appears to the FHG. There are two processes to produce FHG in a FHG crystal. One is the summing interaction between the fundamental and the third harmonic. Another is the doubling interaction for the second harmonic radiation itself. In the absence of resonant harmonic generation, the summing interaction in the FHG crystal with a high intensity fundamental radiation is much more efficient than the doubling.

As an example, a relevant arrangement for the FHG with using three nonlinear crystals is shown in FIG. 10. A relevant cavity arrangement to serve this purpose can be chosen from those shown in FIGS. 1A–C, 2A, 2E and 8A–C, or even in FIG. 9; except i) doubler is replaced by three serial nonlinear crystals, ii) change coating according to requirements, and iii) the crystals move to the outside of beam expander 23 within the unexpanded beam portion in FIGS. 1A–C.

A crystal LBO 71 is set with type I for the SHG (532 nm), which produces two orthogonal polarizations between a fundamental (1064 nm) and a second harmonic (532 nm). This situation is just suitable for the following summing process within a crystal LBO 72 which is set with type II for producing the THG (355 nm). Finally, a crystal LBO 73 is set with type I for producing the FHG (266 nm), in which two polarization directions of 1064 nm and 355 nm radiations is parallel and oriented orthogonal to the optical axis. To avoid using an extra waveplate to adjust the polarization of the fundamental radiation, this type I-II-I is the only choice on the present purpose, but other nonlinear crystals besides LBO may be used.

It is worth noting that, as an important feature, the laser polarization at the fundamental wavelength is not affected by such type I-II-I arrangement. Therefore, it is not necessary to keep nonlinear crystals as a full- or half-wave plate at the fundamental wavelength with serious temperature control.

A similar arrangement was used by Ruikun Wu for pulsed UV lasers, OSA Ann. Meet. Technical Digest, Advanced Solid-State Lasers, AMG4, p.119, Feb. 7–10, 1994, Salt Lake City. However, such design has more advantages and less cares, and is much more desirable and necessary for true CW devices due to a much lower intracavity power intensity. All-intracavity design with multiple nonlinear elements is much better for CW-mode operation after solving its remaining difficulties.

Further, the resonantly enhanced technology, i.e., the resonant harmonic generation technology, can be applied for producing third and fourth harmonic generations as well as frequency mixing with using two nonlinear crystals in sequence, in which the intensity of second harmonic radiation is largely enhanced due to its resonance within a cavity.

As to the THG, the first crystal is used for doubling a fundamental radiation to a second harmonic radiation, the second is for summing the two radiations of the fundamental and second harmonic. This situation is the same as that shown in FIG. 10, i.e., crystals 71 and 72.

As to the FHG, the first crystal is used for doubling a fundamental radiation to a second harmonic radiation, the second is for doubling the second harmonic radiation to a quadrupling harmonic radiation. The two crystals can be selected from any combination among type-I and type-II.

As to frequency mixing, the first crystal is used for doubling a fundamental radiation to a second harmonic radiation, the second is for mixing the second harmonic radiation and an input radiation. For example, a fundamental radiation is 2067 nm ($\omega_1$) produced by Tm/Ho:YLF, an input radiation is 1369.5 nm ($\omega_2$) produced by Er:YAP/YAG with frequency doubling, thus, a output radiation $\omega_3=2\omega_1+\omega_2=$ 589 nm, which is a very demanded wavelength in some applications. Here, the $\omega_1$ and $\omega_2$ can be exchanged, also, the resonant harmonic generation can be replaced by the resonantly enhanced input, or both occur simultaneously.

Since the two polarization directions of the fundamental and second harmonic radiations are not parallel to each other under any combination between the two crystals in the case of the THG or FHG, the applicable cavity arrangement should not include the polarizer and be selected from the two as shown in FIGS. 1A and 8A; except i) the doubler is replaced by two nonlinear crystals, and ii) change coating according to requirements.

Once again, here it commonly is not necessary to keep the two nonlinear crystals for producing FHG as a full- or half-wave plate with serious temperature control, even though in which one or two nonlinear crystals with using type-II doubling and the "twisted mode" operation involves, as long as the two crystals are oriented properly similar to the principle and situation as mentioned in the FIG. 1A.

On the other hand, however, there is an extra problem caused by the dispersion effect, which is similar to the green light feedback effect, resulting in two additional requisites. Thus, in order to make a second harmonic radiation resonance within a cavity, first, the cavity optical path length enables to be adjusted by a cavity distance adjustor, or a phase compensator, shch as optical wedge, so as to obtain in-phase condition at the second harmonic wavelength. Second, the cavity optical path length must be kept constant seriously. If necessary, an automatic electronic servo may be applied.

Moreover, some common issues also need to be attended, such as i) the laser medium has a high transparency to the second harmonic radiation, otherwise, its one side close to nonlinear crystals needs to be HR coated at the second harmonic wavelength and simultaneously HT coated at the fundamental wavelength; ii) the inserted etalon for the fundamental laser operation is AR coated (T>99.5%) for the second harmonic radiation, even so, this requirement is practicable with a low-finesse etalon at the fundamental wavelength; iii) if the operation within UV range, the second nonlinear crystal is suitable to the UV operation, such as LBO, KBBF and SBBO; iv) all optical surfaces of inserted elements, including both faces of crystals, had better to be AR coated at both fundamental and second harmonic frequencies; and v) the beam expander should work properly at the second harmonic wavelength.

Finally, in order to increase the conversion efficiency, the above mentioned resonant harmonic generation technology can be applied for directly producing green light with using one nonlinear crystal as usually.

Part V Noncircular-Profile Pump Heads for Pumping Laser Slab or Rod FIGS. 11A–B to FIGS. 12A–D In accordance with the principles of the present invention, the pumping arrangements shown in FIGS. 3A–F, 4A–F, 5A–E and 6A–E can be used for producing a gain region in the shape of either a line within a laser chip, or a thin layer within a laser slab, and the pumping arrangements shown in FIGS. 5E and 6E can also be used for producing a gain region in the shape of a line for the prism beam expander cavity. However, it is much more suitable to use the multipass reflector of a noncircular cross section for pumping laser slabs. In fact, the noncircular-profile reflector is a very important improvement at some points and has some significant advantages in comparison to those regular circular reflectors. It is going to be further explained and described as follows.

Figure 11:
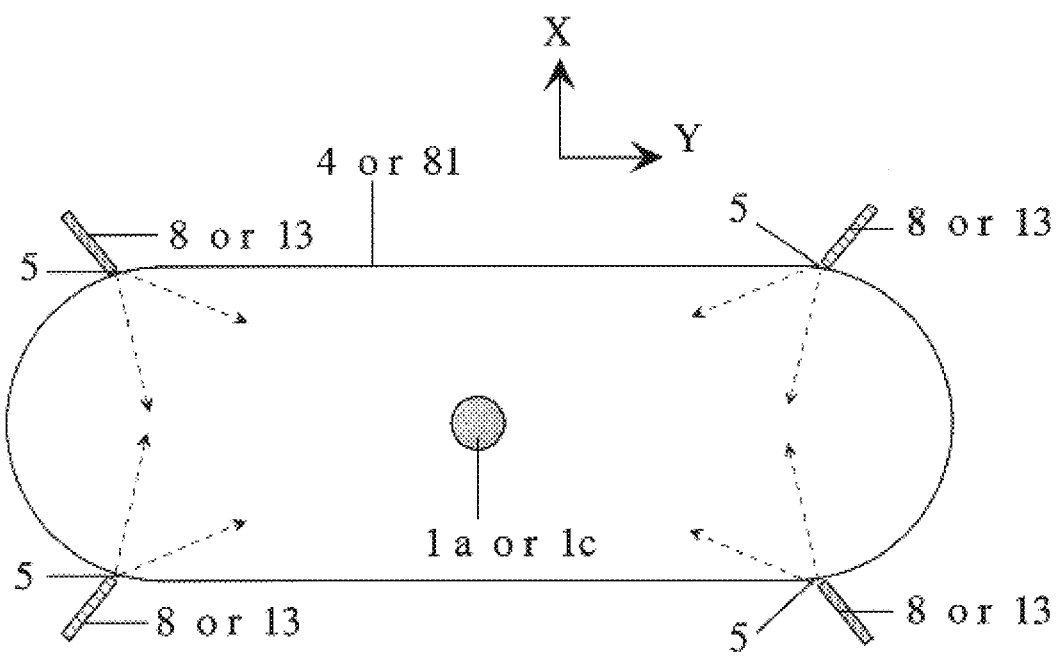
FIG. 11A is the side sectional view of the pump head with a noncircular-profile reflector in the shape of a rounded rectangle in the case of 4-side pumping, and it shows the cross-section of either a disk-waveguide pump head with fiber pumping similar to that shown in FIGS. 3A–C, or a regular pump head used for pumping a laser rod with diode bars similar to that shown in FIGS. 4A–E. This is the third pump embodiment in accordance with the present invention.
FIG. 11B is the perspective view of a noncircular-profile reflector pump head used for pumping a laser rod with four linear array laser diode bars.
Figure 11:
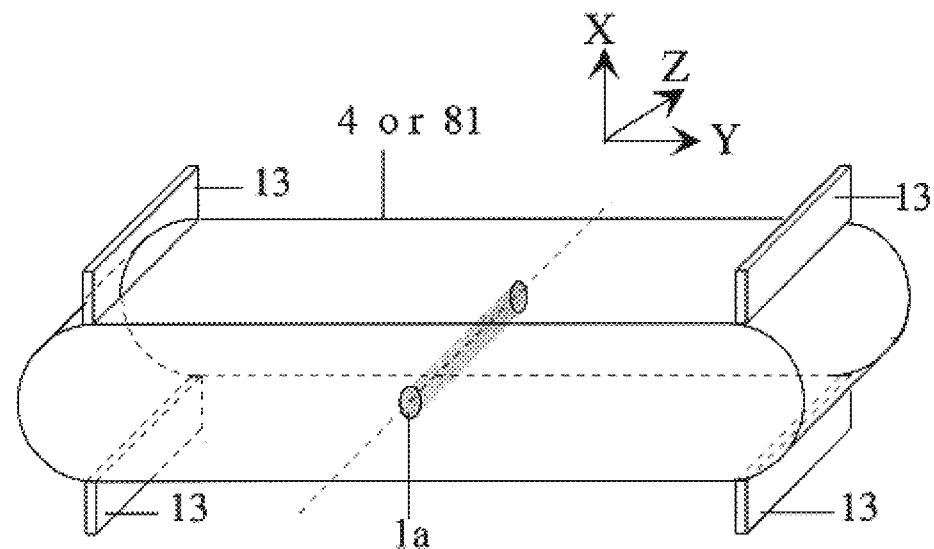

In order to easily illustrate and understand noncircular-profile, multipass reflectors, they are initially introduced for pumping laser rods or circular gain chips rather than laser slabs. By way of example, FIG. 11A shows the side sectional view of a reflector in the shape of a rounded rectangle, which may demonstrate the cross-section of either a disk-waveguide pump head with fiber pumping similar to that shown in FIGS. 3A–F, or a regular pump head used for pumping laser rods similar to that shown in FIGS. 4A–E. This is the third pump embodiment in accordance with the present invention.

Such a noncircular-profile reflector 81 can also provide the multipass side-pumping specialized in the present invention. But in the most situations, the pumping beams need much more reflections within the reflector to meet a chance to pass through the gain medium.

The most advantageous characteristic in the use of noncircular profile reflectors lies in their ability to provide a very large pump acceptance cone close to 180°, whether or not the gain media are surrounded by the special cladding. Therefore, for the case involving a regular pump head for pumping laser rod, a linear array laser diode bar can directly be butt-coupled to the stripe entrance without using collimating lens. And in the case of a disk-waveguide pump head, fiber bundles with a large N.A. can be employed for delivering pumping beams, or a laser diode can directly be butt-coupled to the slit entrance without using collimating lens.

For example, to construct such a reflector for a regular pump head with diode bars pumping, a laser rod/bar has a diameter/size of 1 mm which may or may not have a normal pump cladding, and the rectangle size is chosen to be 6×40 mm around. There are four pump entrances shown in FIG. 11A. The pump entrance is 0.5 mm or less in width. In comparison with about 118 mm of the circumference of the reflector, the escape possibility of the pumping beams is small. FIG. 11B shows the perspective view of a regular pump head with a rounded-rectangle-profile reflector, aforespecified, wherein a laser rod is pumped by four linear array laser diode bars.

A noncircular-profile reflector may be hollow when it is made up of an envelope and two end-plate reflectors which have a hole for lasing passage. Or, a noncircular-profile reflector may be solid when it is made up of a pump cladding with outside coating. Considering the large angles of incidence of the pumping beams, the two end plates of the reflector, or the two end optical facets of the pump cladding, usually would not need to be coated due to total-internal-reflection of the pumping beams. This principle is applicable to FIGS. 4A–E above, and FIGS. 16C–D below. In regard to the thermal management, either the direct or indirect cooling approach aforespecified in the description for FIGS. 4A–E can be applied.

Pump arrangements using noncircular-profile reflectors are exceedingly well suited for pumping laser slabs. As some exemplary configurations of the preferred embodiment, FIGS. 12A–D show two pump arrangements for pumping laser slab 1b similar to that shown in FIGS. 11A–B. Obviously, for such a case, it is entirely possible for the pumping beams to pass through the gain medium in every complete trip. In comparison with other pump schemes used for pumping laser slabs, this distinguishing feature will provide a much better pump solution with the highest possible efficiency, simplicity and flexibility with arbitrarily scalable output power, suitable to any kind of laser material, regardless of its size, thickness or absorption coefficient.

Figure 12:
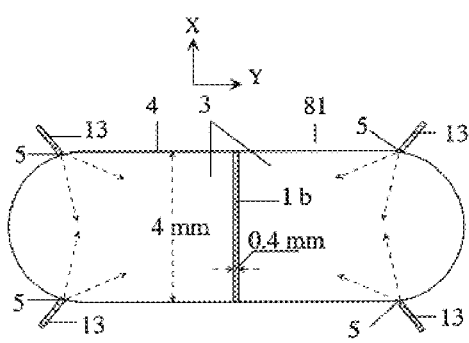
FIGS. 12A–B are, respectively, the side sectional and perspective views of a noncircular-profile reflector pump head used for pumping a laser slab with four linear array laser diode bars; in which the reflector is solid and made from pump cladding with outside coating.
FIGS. 12C–D are, respectively, the side sectional and perspective views of a noncircular-profile reflector pump head used for pumping a laser slab with four linear array laser diode bars, in which the reflector is made from a hollow envelope. The laser slab is sandwiched by two cooling channel blocks which provides coolant passages for cooling.
Figure 12:
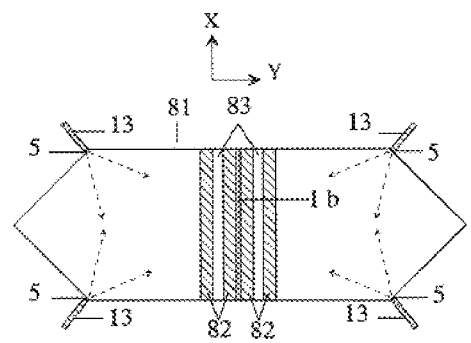
Figure 12:
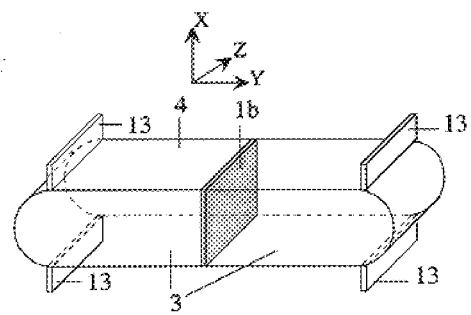
Figure 12:
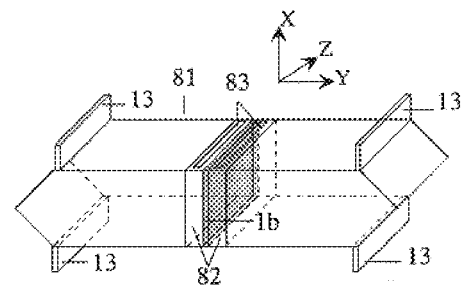

FIGS. 12A–B are, respectively, the side sectional and perspective views of a noncircular-profile reflector pump head for pumping laser slab with a solid body made up of the pump cladding. FIGS. 12C–D are, respectively, the side sectional and perspective views of a noncircular-profile reflector pump head for pumping laser slab with a hollow envelope. In order to dissipate heat via coolant, laser slab 1b is sandwiched by two cooling channel blocks 82 which can be made from the pump cladding. Block 82 contain an internal passage 83 for coolant circulating.

Before efforts are made to build the multipass reflector, attention is called to two facts. First, the angles of incidence of the pumping beams variate or spread widely. Second, the reflectance of conventional, multilayer dielectric coatings, which usually have the highest reflectivity, is largely dependent on the angle of incidence. Based on these considerations, several approaches can be selected to build the reflector. First is an evaporated metal-coated reflector, such as the use of silver, gold, copper and so on. Second is a diffuse reflector which is usually fabricated from ceramics or compressed powder. Third, the pump cladding is not coated. Due to total-internal-reflection, those pumping beams with their angles of incidence larger than the critical angle, are totally reflected. And an extra reflector with a conventional HR coating, is added to surround the pump cladding, in order to repetitively reflect the remaining pumping beams. Those remaining pumping beams have small angles of incidence. Such a setup is typical of an optical reflectivity higher than 95%, regardless of the angles of incidence. It is named the double-layer reflector and is illustrated in FIG. 16D below.

Part VI Waveguide Pump Heads for Pumping Laser Slab or Rod FIGS. 13A–B to FIGS. 15A–C In further accordance with the principles of the present invention, in order to use a simple way to obtain an optimum reflection, a reflector also can be built as an optical waveguide as exemplified in FIGS. 13A–D, FIGS. 14A–B, FIGS. 15A–C and FIGS. 16A–C. The related pump heads are named as the slab and cylinder waveguide pump head, respectively. These embodiments are a direct combination of the noncircular-profile reflector and the disk-waveguide pump head.

In FIGS. 13A–D and FIGS. 14A–B, the major difference from regular noncircular-profile reflectors is that, the all or major surfaces of pump cladding 3, which is made as a slab or cylinder, are not coated while its end optical facet is at times coated; and an extra prism coupler or prism-like coupler, named as beam guide input coupler 84, is used for coupling and guiding the pump beams into the waveguide pump head with large angles of incidence. These angles of incidence must be larger than the critical angle so that the pumping beams, once entering, will be able to undergo total-internal-reflection, be reflected repetitively and confined within the waveguide pump head. For example, the critical angle of pump beams within the pump cladding made of the undoped YAG crystal is around 33.5°.

Figure 13:
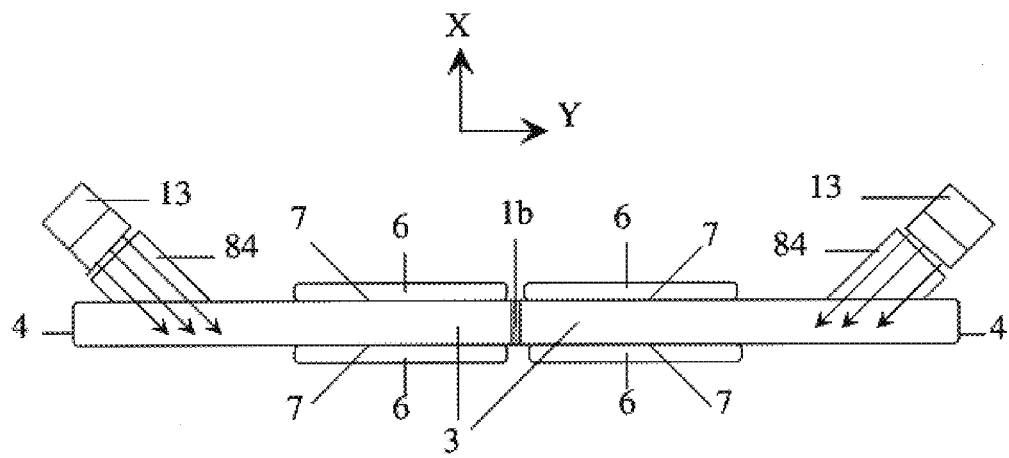
FIGS. 13A–B are, respectively, the side sectional and perspective views of a slab waveguide pump head used for pumping a laser slab with two linear array laser diode bars. The beam guide input coupler is applied to confine and input the pumping beams from the diode bars into the slab waveguide, and its orientation is set in associate with the unique feature of the highly asymmetric divergent pumping beams so as to accommodate the pumping beams with total-internal-reflection. This is the fourth pump embodiment in accordance with the present invention.
FIG. 13C is the perspective view of a cylinder waveguide pump head similar to FIGS. 13A–B but used for pumping a laser slab disk.
FIG. 13D is the perspective views of a cylinder waveguide pump head used for pumping a laser rod which is surrounded by the graded- or step-index pump cladding. Such a pump head also can be used for pumping optical fiber lasers or optical fiber amplifiers.
Figure 13:
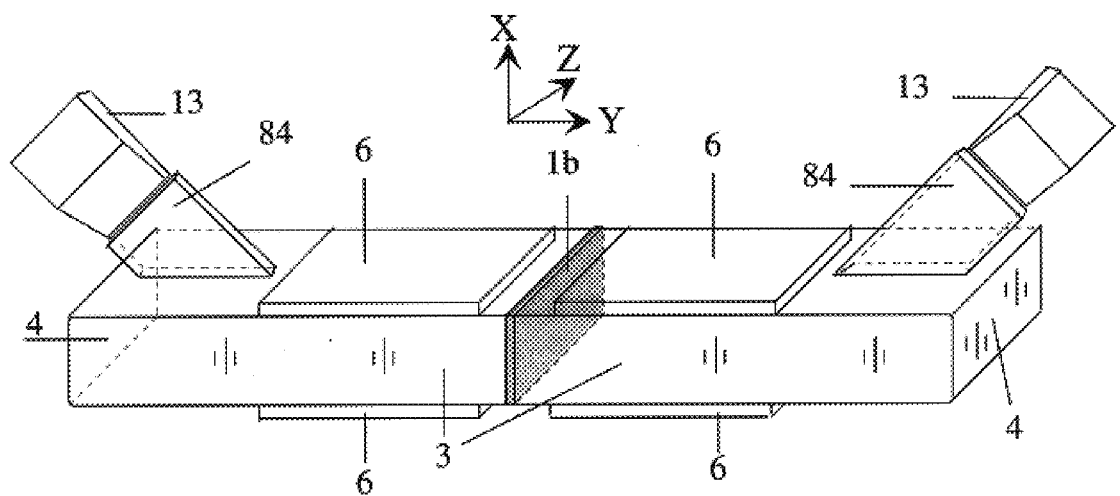
Figure 13:
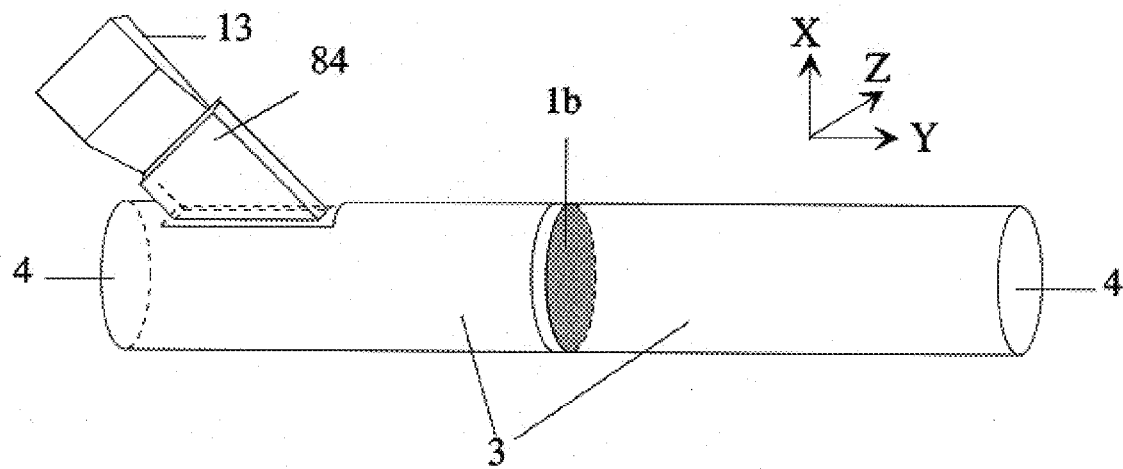
Figure 13:
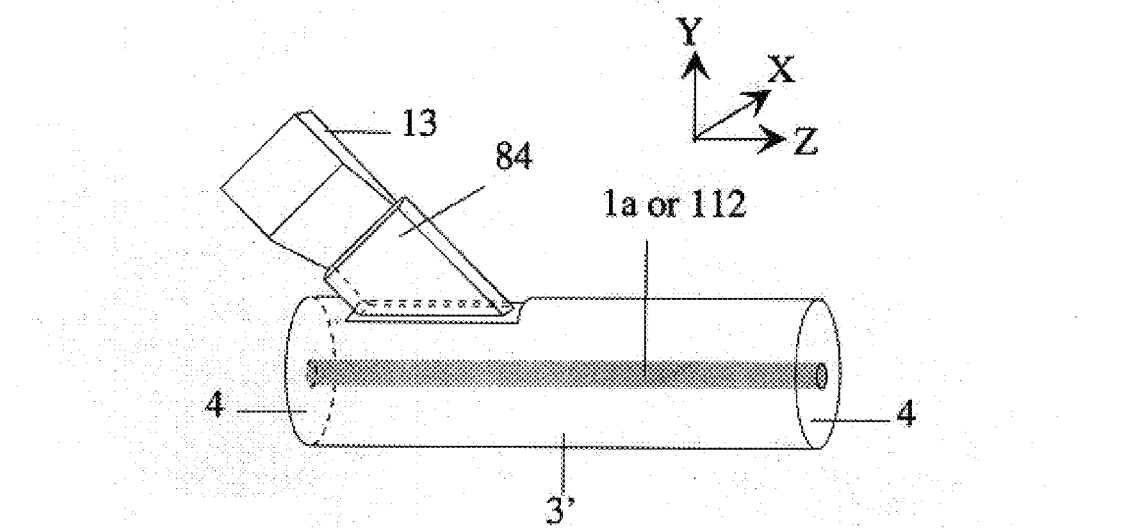

FIGS. 13A–B are, respectively, the side sectional and perspective views of a slab waveguide pump head pumped by two linear array laser diode bars. A laser slab 1b placed in the XZ plane is sandwiched, optionally optically contacted without using an index-matching material, by two slab-shaped pump cladding 3. A beam guide input coupler 84, a thin prism-like optical element, preferably being made of the same material as that of cladding 3 and optically contacted with cladding 3, is applied for guiding the pumping beams into the waveguide pump head at a certain angle of incidence, preferably 45°, along the XY plane as shown. Note that the beam divergence of diode bar 13 is small in the XY plane perpendicular to the laser slab plane, diode bar 13 can be directly butt-coupled to coupler 84 without collimation, regardless of the kind of the vertical beam divergence it has in the XZ plane, i.e., the laser slab plane. The two far-end optical facets of the pump cladding, if needed, have HR coating 4 at pump wavelength, such as in the case when the refractive index of pump cladding 3 is less than 1.5 approximately. This is the fourth pump embodiment in accordance with the present invention.

As for cooling, four heat sinks 6 are bonded to two sides of the peripheral section of cladding 3 for the heat dissipation via TE coolers and fans. For maintaining total-internal-reflection as well as a good thermal conductivity, a metal foil 7, such as aluminum foil, should be inserted within the bond area between cladding 3 and heat sink 6. Optionally, the cooling approach described in FIGS. 12C–D may be applied, in which the laser slab is sandwiched symmetrically by two cooling channel blocks. The refractive index of the coolant may need to be selected properly to allow the pumping beams to pass it easily. Moreover, in physical contact with the entrance/exit of the cooling channel block, a ring-shaped aluminum foil (not shown) must be inserted between a sealed O-ring (not shown) and the cooling channel block to preserve total-internal-reflection. The sealed O-ring usually is used for purpose of connecting with a cooling system (not shown).

FIG. 13C is the perspective view of a cylinder waveguide pump head similar to that shown in FIGS. 13A–B. A laser slab 1b, shaped like a round plate and named the laser slab disk, is sandwiched by two cylinder-shaped pump cladding 3s. It may be optically contacted without using an index-matching material within the bonding area.

FIG. 13D is the perspective view of a cylinder waveguide pump head used for pumping a regular laser rod. Laser rod 1a is surrounded by a graded- or step-index pump cladding 3', in which cladding 3' is not needed to encompass the entire longitudinal extent of laser rod 1a. This feature also can be applied for the relevant cases, such as shown in FIGS. 16A–B below. In the case when the direct cooling approach is applied, the refractive index of the coolant needs to be selected properly or close to that of the laser rod, in order to avoid total-internal-reflection when the pumping beams pass through it. In the case when the indirect cooling approach is applied, a transparent material with a refractive index larger than that of air, preferably an index-matching transparent material, is used to fill up the interstice between laser rod 1a and cladding 3', to avoid total-internal-reflection when the pumping beams pass through the interstice. As an alternative, a clear, transparent, heat conducting film, such as an optical cement can be used. This principle also is applicable to the relevant cases, such as shown in FIGS. 4A–E above, and FIGS. 16A–C below.

Figure 14:
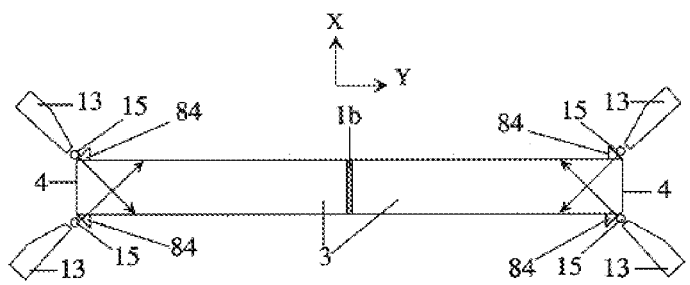
FIGS. 14A–B are, respectively, the side sectional and perspective views of a slab waveguide pump head used for pumping a laser slab with four linear array laser diode bars. The pumping beams, before entering via a prism, are collimated by a collimating lens, so that the angles of incidence of the pumping beams within the slab waveguide distribute over a small range, leading to a satisfaction for total-internal-reflection.
Figure 14:
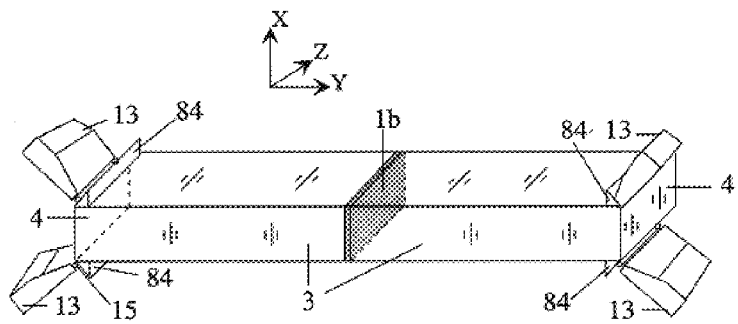

FIGS. 14A–B are, respectively, the side sectional and perspective views of a slab waveguide pump head pumped by four linear array laser diode bars. There are two major differences from that shown FIGS. 13A–B. First, the space position of a diode bar 13 has been rotated 90° so that the long dimension of linear array laser diode bar 13 becomes parallel to the laser slab plane or XZ plane. Second, the beam guide input coupler 84 is now a standard prism. Note that the beam divergence of diode bar 13 is large in the XY plane perpendicular to the laser slab plane, in the present arrangement, attempt to accommodate the condition with total-internal-reflection relies on controlling the distribution of the angles of incidence of the pumping beam within a certain range. Therefore, the pumping beams, before entering, should be collimated by a one-dimensional collimating lens 15 in the XY plane perpendicular to the diode junction plane, leading to lowering the vertical beam divergence.

Figure 15:
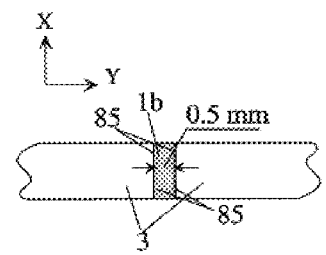
FIGS. 15A and 15B both show a part of a slab waveguide pump head, in which the size of the pumping region or the laser slab along the X dimension is smaller than that of the pump cladding.
FIG. 15C shows a part of a slab waveguide pump head, in which a laser rod replaces the laser slab.
Figure 15:
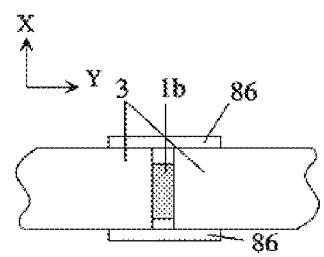
Figure 15:
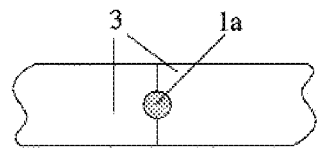

In FIGS. 15A and 15B the size of the pumping region or the laser slab along the X dimension is shown to be smaller than that of cladding 3. In FIG. 15A, the ends of both sides of laser slab 1b have HR coating 85 to protect the two end areas from being pumped. In FIG. 15B, there exist two small gaps due to the smaller laser slab along the X dimension. Therefore, the two small optical plates or mirrors 86 serving as the gap plate/mirror are added. In FIG. 15C, a laser rod 1a is used to replace laser slab 1b. The cooling parts are not shown in FIGS. 14A–B and FIGS. 15A–B for simplicity, but they would in general be such a cooling setup used in FIGS. 13A–B or in FIGS. 12C–D.

Part VII Improvements for Dube's Pump Cavity FIGS. 16A–C

In the U.S. Pat. No. 5,619,522, G. Dube devises a novel multipass pumping configuration. His pump cavity is primarily made up of two semi-cylindrical, or two arcuate, or two one-half of a regular polygon optical reflective surfaces. There is a some difference or the same between the two radii of the pair. They are arranged colinearly but not coaxially with each other. Thus, the longitudinal axes of the two reflective surfaces are parallel and off-set from each other. This pumping geometry converge the pumping beams to the center area once entering at the edge of the pump cavity. Afterwards, it diverge from the center area along the original spiral paths, via multiple reflecting by the two reflective surfaces.

Nevertheless, Dube fails to discover a key factor in his invention. That is, it is vital to obtain a high reflectivity in practice in the successful multi-reflecting pump process, based on the consider at that the angles of incidence of the pumping beams on the main/end surfaces within the pump cavity, variate or spread widely, particularly for pumping a laser rod with a small diameter of around 1 mm. It is mostly desired in the DPSS lasers. In such a case, the pumping beams usually need more than tens or a few tens reflections so as to reach the center area and stay long enough within Dube's pump cavities. As mentioned before, the reflectance of conventional, multilayer dielectric coatings, which usually have the highest reflectivity, is largely dependent on the angle of incidence. And the reflectivity of the metallic coatings such as gold or silver drops apparently at a large angle of incidence In order to solve the key issue that has unsolved in Dube's invention, according with the principles of the present invention, one can build the Dube's pump cavity as an optical waveguide aforespecified, particularly in FIGS. 13A–D and FIGS. 14A–B.

FIGS. 16A–B are, respectively, the side sectional and perspective views of the first Dube waveguide pump head pumped by one linear array laser diode bar. A laser rod 1a is surrounded by a pair of semi-cylinder pump claddings 91 and 93. There is little difference between the two radii R1 and R2 of the pair. They are arranged colinearly but not coaxially with each other. The center of pump cladding 91 is at 92, whereas the center of pump cladding 93 is at 94. The centers of the two surfaces are thus off-set from each other. In the same way described before in FIGS. 13A–D, a beam guide input coupler 84 is placed and contacted with the surface in the shape of a strip, i.e., the physical opening at the outermost portion of lower pump cladding 93. Input coupler 84 guides the pumping beams into the waveguide pump head at a certain angle of incidence, preferably 45°, along the XZ plane as shown. After properly selecting the pump cladding of a large refractive index, typically larger than 1.6 approximately, total-internal-reflection would occur on all the optical surfaces, including the end optical facets of the pump cladding. In regard to the thermal management, either the direct or indirect cooling approach aforespecified can be applied.

Similarly, FIG. 16C shows the side sectional view of the second Dube waveguide pump head. A laser rod 1a surrounded by a cooling fluid 97 is received in two one-half of a regular polygon, i.e., a pair of corner pump claddings 95 and 96. There is little difference between the two sizes of them. They are arranged colinearly but not coaxially with each other. In the same way as aforespecified in FIGS.

14A–B, in order to accommodate the condition with total-internal-reflection by controlling the distribution of the angles of incidence of the pumping beam within a certain range, the pumping beams, before entering, are collimated by a one-dimensional collimating lens 15. As previously emphasized, the two end optical facets of the pump cladding would not need to be coated in view of total-internal-reflection, considering the large angles of incidence of the pumping beams.

The direct or indirect cooling approach, aforespecified, can be applied. The direct cooling approach is illustrated in the drawing. A hole within the pump claddings provides a tubular sleeve and forms a passageway through which coolant flows in direct contact with laser rod 1a. The two caps (not shown) are each clamped, from both sides via O-rings, to the two end optical facets of pump cladding 95 and 96 for holding laser rod 1a and furnishing passages for the entry and exit of cooling fluid 97. An aluminum foil should be inserted within the bond area between the optical facets and the O-rings to maintain total-internal-reflection.

Next, in order to obtain the high reflectivity, one can build the Dube's pump cavity as a double-layer reflector pump head. FIG. 16D shows the side sectional view of the Dube step-index double-layer reflector pump head. A laser rod 1a, surrounded by a pump cladding 3 in the shape of a cylinder or the like, and encompassed by a cooling fluid 106, is received and located in the center area of a pair of semi-cylinder inner sleeves 101 and 103, preferably made of a regular glass material. There is little difference between the two radii R3 and R4 of the pair. They are arranged colinearly but not coaxially with each other. A pair of outer sleeves 102 and 104 surrounds inner sleeves 101 and 103 with a air interstice. Their inner surfaces are HR coated at pump wavelength and matched to the outer surfaces of inner sleeves 101 and 103 geometrically in cross-section.

Regarding the end management, it should be similar to that shown in FIG. 16C. As an alterative, particularly in cased when the radial extent of the coolant channel is large, two extra optical plates with a center hole would be inserted to between the optical facet of the inner sleeves and the caps, so as to prevent the pump power leakage from the coolant channel. The redundant description will be avoided for simplicity. Once again, in FIG. 16D, the outer surfaces of inner sleeves 101 and 103 is not coated. Those pumping beams which have the angles of incidence larger than the critical angle, would be totally reflected via total-internal-reflection. The remaining pumping beams which have relatively small angles of incidence, are reflected by the HR coated reflector.

The two refractive indexes of the inner sleeves and cooling fluid 106, are the same or close. They should be properly selected to form a step-index structure associated with pump cladding 3. Also, the related parameters, such as the diameter of pump cladding 3, the radial extent of the coolant channel should be designed appropriately. But the criteria for the design are somewhat different from those for the regular one aforespecified in FIG. 4D or FIG. 4E. A person skilled in the art would be able to carry out an applicable design. Such a step-index structure is capable of preventing the pumping beams from deviating from the center area and from returning to the original spiral paths and exiting.

Apparently, these pumping configurations shown in FIGS. 16A–D can be applied for the disk-waveguide pump head to produce a thin gain zone within a gain medium, or also for an optical amplifier as discussed below in FIGS. 18A–B.

Finally, there are several points worthy to be noted by the following.

1. In comparison, pump heads of different geometry configurations, such as those shown in FIG. 13D, FIGS. 16A–B, FIG. 16C and FIG. 16D, should almost maintain the same performance level if the pump power is confined within the pump head without apparent losses.

2. Alternatively, in order to increase the pump intensity and decrease the pump power leakage from the entrance area, the laser diode pump source can be fiber coupled to the pump head with or without using a beam guide input coupler in the cases shown in FIGS. 13A–C, FIGS. 14A–B, FIGS. 15A–C and FIGS. 16A–D.

3. The pump source can be derived from diode laser pump sources, or other laser pump sources, including multiple pump sources with a single or multiple pump wavelengths. The laser material can be co-doped with a second active lasing ionic species or sensitizer ions, or consisted of two different lasing components. The latter can be used in particular for purposes of upconversion lasers and lasers with multiple output wavelengths.

4. The polarization status of the pumping beams within the waveguide pump head shown in FIGS. 13A–B is different from that of shown in FIGS. 14A–B. And, the rectangular pump cladding is characteristic of polarization preservation of the pump light. The laser slab should be properly designed to avoid the potential problem of parasitic oscillation.

5. The above depicted multipass pumping approaches provide slab-shaped gain regions and can be used for several different types of cavity configurations, such as one-dimensional beam-expanding cavities with an optical propagation along a zig-zag path, and multifolded cavities and hybrid cavities. A hybrid cavity functions as a waveguide along the Y dimension and as an unstable resonator on the X dimension, such as that used by Coherent for the model K500 $CO_2$ laser or in their U.S. Pat. No. 5,353,297 for $CO_2$ lasers.

Part VIII Waveguide Pump Heads for Pumping Fiber Laser FIGS. 17A–D

In the rapidly growing field of optical signal communication systems, fiber lasers of the type that comprise optically transmissive cores doped with rare earth ions are being increasingly recognized as important components of such systems. Thus, rare-earth optical fiber lasers can be utilized in these systems as optical signal generators, as optical signal amplifiers and as pump lasers for other optical fiber amplifiers. Many efforts have been directed at trying to devise a more effective way of increasing the pumping power that can be delivered to the core of a single-mode fiber amplifier. Several advanced technologies on cladding-pumped optical fiber lasers, commonly referred to as cladding pumping, have been developed. They are described in U.S. Pats. Nos. 5,530,709 and 5,530,710, and in the paper "High power neodymium-doped single transverse mode fiber laser," Elec. Lett. 29(1993)17, p.1500.

A cladding-pumped fiber presently in use relies on a relatively large, separately light-guiding pump cladding that surrounds a much smaller rare-earth-doped fiber core. Pump light from a diode array is focused into the pump cladding with the end-pumping or quasi-end-pumping schemes, and then confined and guided within the cladding. As the pumping light propagates along the cladding, the light crosses over and is absorbed by the single-mode core, thereby supplying pumping power. The approach enables the absorbed multimode power to be converted into a single-mode laser emission within the fiber core.

In order to further expand the utilization of the present invention to pump optical fiber lasers or amplifiers, the novel side-pumping approaches characterized by the multipass pumping geometry can significantly be applied. There are two major preferred practices. In the first practice, a fiber assembly in a certain shape can be used to replace the laser slab 1b in FIGS. 13A–B, or FIGS. 13C, or 14A–B, under the condition that an optical fiber with a rare-earth-doped core is arranged repetitively through the multipass pump area.

As an exemplary configuration of the preferred embodiment, FIG. 17A shows a pump arrangement capable of providing multipass side-pumping for fiber lasers and fiber amplifiers. It is the first pump embodiment for pumping optical fiber in accordance with the present invention. This pump arrangement is the same as that shown in FIGS. 13A–B except that the laser slab 1b is replaced by a fiber assembly 113. Fiber assembly 113, as shown in FIG. 17B, is built up of an optical fiber 111 with a rare-earth-doped core, where fiber 111 is winded onto an inner frame 114 and placed between inner frame 114 and an outer frame 115. The critical radius for fiber bend loss should be considered. Both the inner and outer frames preferably are made of the same material as that of pumping cladding, or an HR coated material at pump wavelength. An index-matching transparent material or fluid, if needed, is filled up between fiber 111 and pump cladding 3. FIG. 17C shows the perspective view of fiber assembly 113.

As an alternative shown in FIG. 17D, fiber assembly 113 can be pumped sectionally by one or more pump heads, in which several phantom rectangular areas are indicated for pumping, where every pump area is pumped by a pump head shown in FIG. 17A. In such a case, considering that fiber assembly 113 is not entirely pumped, the absorption loss within an unpumped volume of fiber 111 should be small. Under this pump arrangement of FIGS. 17A–D, there is no special requirement for the configuration and sectional profile of fiber 111, except its protective material or coating is transparent for the pumping beams.

In the second preferred practice of pumping fiber, one can simply replace laser rod 1a with a double-clad fiber 112 within the cylinder waveguide pump head shown in FIG. 13D. This is the second pump embodiment for pumping optical fiber in accordance with the present invention. In such a case, only a small portion of fiber 112 stays with the pump head and is surrounded by pump cladding 3'. Thus, this pump head used for fiber lasers would be named the "pre-stage pump head". At both ends of the cylinder waveguide pump head or pump cladding 3', the pump beams, once entering fiber 112, are continuously confined and guided within the fiber's cladding until they are completely absorbed by the rare-earth-dopant in the fiber core. However, the critical angle of pump beams within the fiber cladding usually is around 70°–83°, much larger than that within cladding 3'. One must take precautions to keep the pumping beams under total-internal-reflection condition within fiber 112 and, at the same time, to allow pump beams to enter fiber 112 from pump cladding 3' without a difficulty. Therefore, first, the laser diode pump source may need to be directly fiber coupled via a low N.A. optical fiber, to the pump entrance located at one end wall of cladding 3'. Second, the refractive index at the end of cladding 3' adjacent to fiber 112 is roughly close to that of the outer cladding of fiber 112. And an index-matching transparent material or fluid is filled up between fiber 112 and pump cladding 3'.

Figure 18:
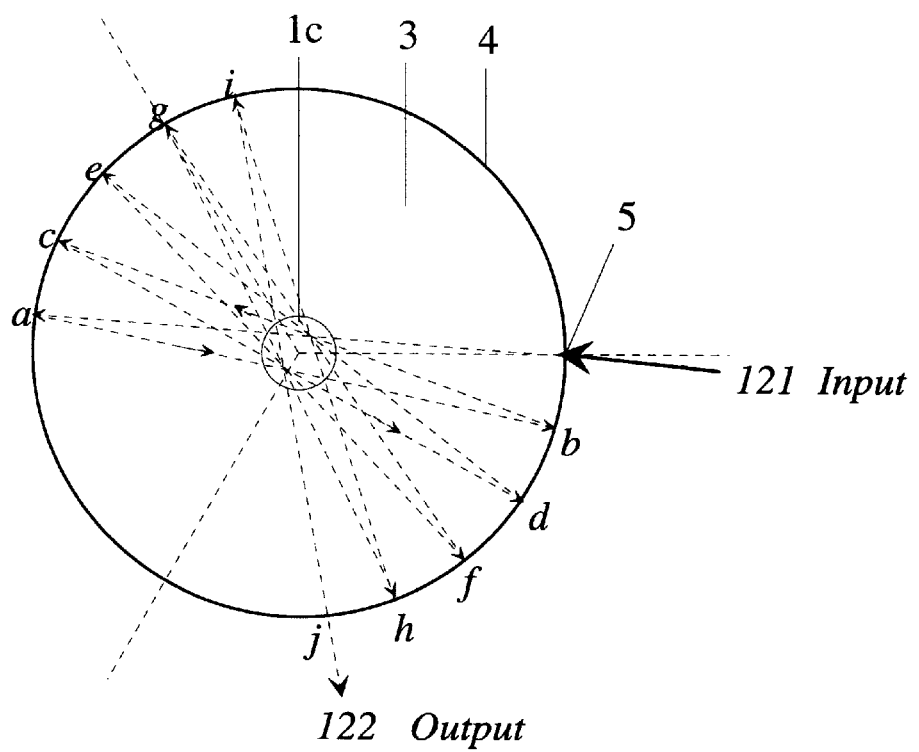
FIGS. 18A–B show the multipass optical amplifier configuration variated from the disk-waveguide pump head.
Figure 18:
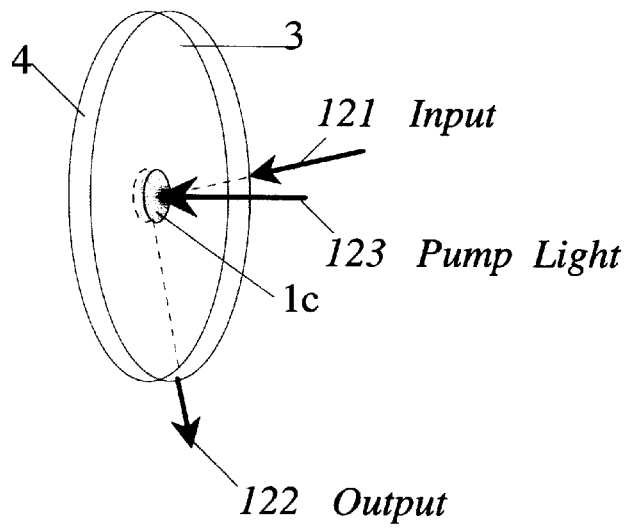

Part IX Multipass Optical Amplifier FIGS. 18A–B

As a further direct extension in accordance with the principles of multipass pumping geometry of the present invention, the pump approaches for the disk-waveguide pump head shown in FIGS. 3A–F can easily be modified to become a multipass optical-amplifier shown in FIGS. 18A–B. FIG. 18A shows a multipass geometrical path of an input signal or probe 121 within a disk-waveguide, which is exactly the same as that shown in FIG. 3D. Input signal 121, once entering from an entrance 5, is confined within the planar disk-waveguide and multi-reflected by an outside coating 4 of pump cladding 3 at points a, b, c,—up to point j, the exit successively. Thus, input signal 121 passes through the gain medium, i.e., laser chip 1c, to be amplified as many times as needed until outputting from the exit at the j point as an output signal 122. The exit is an AR-coated or un-coated window at the signal wavelength. As for the pumping scheme, the gain medium can directly be pumped by a pumping light 123 as shown in FIG. 18B, or by the pumping light which has the same or similar optical track as that of the amplified signal. The pumping scheme shown in FIGS. 3A–D also can be used for the purpose.

Dube's multipass geometrical construction shown in FIGS. 16A–D also can be applied for the multipass laser amplifier. The repetitious description will be avoided for simplicity.

Finally, under circumstance that the gain medium is replaced by an absorption cell, or a sample, or a molecular beam, and that the signal beam is supplanted by a laser beam, this multipass apparatus can widely be applied for many spectroscopy purposes.

Ramifications and Appendix

1. In accordance with the principles of the present invention, through intracavity frequency conversions, the following operation wavelength, as the summary for some illustrative cases, can be obtained:

a) Fundamental radiations: from infrared to mid-infrared ranges, some of which, such as Tm, Ho:YAG/YLF/YSGG with around 2.1 $\mu$m and Er:YAP/YAG with around 2.71–2.94 $\mu$m, directly fall within the eye-safe wavelength region.

b) Intracavity SHG Nd:YAG: 532 nm.

c) Intracavity THG Nd:YAG with using two nonlinear crystal: 355 nm.

d) Intracavity FHG Nd:YAG with using three nonlinear crystal: 266 nm.

e) Intracavity SHG Cr:LiSAF (0.78–1.01 $\mu$m): 390–505 nm.

Tunable laser media, such as Cr:LiSAF and solid dye materials, can also be applied for the laser-cavity designs in the present invention. A spectral tunable element, such as a acousto-optic device, needs to be inserted for wavelength tuning.

f) Intracavity-doubled sum-frequency mixing: $2\omega_1+\omega_2=\omega_3$

2×2067 nm (Tm/Ho:YLF)+2×2738.9 (Er:YAP/YAG)=589nm.

589 nm is a very demanded wavelength in some applications.

g) Intracavity sum-frequency mixing: $\omega_1+\omega_2=\omega_3$ 2058 nm (Tm:YAG)+1047 nm (Nd:YAG)=694 nm.

694 nm also is a very demanded wavelength in some applications.

h) Intracavity sum-frequency mixing: $\omega_1+\omega_2=\omega_3$

1047/1064 nm+(670–690)nm (SDL-7400 laser diode)=409–419 nm i) Intracavity sum-frequency mixing: $\omega_1+\omega_2=\omega_3$ 1047/1064 nm+(780–1060) nm (SDL-8630)=447–532 nm.

with some tunability.

SDL-8630 tunable laser diode provides 0.5 W output power within 780–1060 nm region with 25 nm tuning range.

j) Intracavity sum-frequency mixing: $\omega_1+\omega_2=\omega_3$ 1319 nm (Nd:YAG)+(780–1060) nm (SDL-8630)=490–587.7 nm.

with some tunability.

k) Intracavity difference-frequency mixing: $\omega_1-\omega_2=\omega_3$ (780–1060) nm (SDL-8630)–1319 nm (Nd:YAG)=1.9–5.4 $\mu$m.

with some tunability.

l) Intracavity difference frequency conversion between $\omega_2$ (1.75–2.5) $\mu$m (Co:MgF) or (1.85–2.15) $\mu$m (Tm:YAP) and $\omega_1$, 2.79 $\mu$m (Er:YSGG) or 2.94 $\mu$m (Er:YAG) or (2.71–2.92) $\mu$m (Er:YAP): $\omega_3=\omega_2-\omega_1$ is in the range of 4–10 $\mu$m with some tunability.

2. As a supplement for the use of a prism beam expander cavity, the prism expander also acts as a Brewster plate or a polarizer, and naturally become a birefringent filter in conjunction with the KTP.

3. As a supplement for the use of the corner reflector pump head by the following:

(1) It provides one of the best way in the use of diode bars as the side-pumping source for acquiring uniform pumping and for highly concentrating pump power on the center area of the laser rod. In fact, the pumping density and laser gain in the main center area of a laser rod is larger than the rest outside area. This effect is contributed by a) the 4-side pumping, b) the optimizing absorption coefficient and c) the convergent effect of the pumping beams caused by a higher refractive index of a laser rod, and results in a perfect condition in realizing mode-matched pumping, $TEM_{00}$ mode operation, good beam quality and high efficiency.

(2) The direction of polarization of the front and back pump beams is different from that of the top and bottom pump beams. Considering that for some solid-state laser materials, the pump absorptions are strongly depend on the polarization direction, so that the pump polarization needs to be chosen to ensure the strongest pump absorption in such cases. As a solution, four group of diode bars with different optimized polarizations are employed to provide the required polarized pump beams with four equal portions correspondingly, i.e., every single portion's polarization can easily be accommodated for the strongest pump absorption. Thus, this will be much less of a problem in comparison with the difficulty of using single pump beam on pulsed dye lasers as was disclosed in U.S. Pat. No. 5,371,758.

The invention being thus described, it is obvious that the same may be varied in many ways. Such variations are not to be regarded as a departure from the spirit and scope of the invention, and all such modifications as would be obvious to those skilled in the art are intended to be included within the scope of the following claims.

What is claimed is:

1. In a method for configuring a standing-wave cavity arrangement for solid-state lasers in obtaining stable single-mode operation, whereby overcoming the major difficulty, with intracavity frequency conversions, typically in frequency doubling caused by the so-called "green problem", comprising the steps of (1) constructing a forming means for said cavity, including at least two end mirrors;

(2) constructing a pump head means placed within said cavity for lasing at a fundamental wavelength;

comprising the steps of

A. selecting a solid-state laser medium means;

B. selecting a pump source means including laser diode bars to provide relevant pumping beams for pumping said laser medium means; and C. producing a gain region within said laser medium means by said pumping beams;

(3) constructing a formation of wavelength selectivity with low insertion losses placed within said cavity, wherein the performance parameters of said formation are predetermined whereby to sufficiently and uniquely determine the laser's oscillating frequency and to force the laser to perform a stable single-mode or narrow band operation; and (4) selecting an approach for eliminating or minimizing the spatial hole-burning effect from the group consisting of A. a first approach, comprising 1) creating said gain region within a narrow area along the optical axis of said cavity and immediately adjacent to one of said end mirrors, and 2) selecting said formation from the group consisting of a) a first formation comprising a monochromatic polarizer means, b) a second formation, built up of a Lyot filter and a one-dimensional beam expander means, and c) a third formation, built up of a spectral filter means including at least one spectral filter, and a two-dimensional beam expander means to reduce insertion losses for said spectral filter means substantially; and d) a fourth formation comprising an etalon; and B. a second approach, comprising 1) placing said pump head means between a pair of quarter-wave plates whereby producing the "twisted mode" operation, and 2) building said formation up of a spectral filter means consisting of at least one spectral filter, and a beam expander means to reduce insertion losses for said spectral filter means substantially.

2. In the method of claim 1, wherein said approach is said first approach, further comprising the steps of (1) using a nonlinear crystal means arranged in an optimal condition including phase-matching for intracavity frequency conversion;

(2) maintaining the bandwidth of said formations to be smaller than the laser longitudinal oscillating mode interval of said cavity, and its free spectral range is larger than the FWHM of lasing bandwidth of the gain medium;

(3) building said monochromatic polarizer means up of a polarizer and said nonlinear crystal means;

(4) selecting said spectral filter from the group consisting of

A. Lyot filters, formed by a polarizing means and a birefringent element; and

B. etalons, including 1) regular etalons, and 2) birefringent etalons which acts likewise as an additional Lyot filter in conjunction with said polarizing means;

(5) selecting said polarizing means from the group consisting of 1) Brewster plate, 2) Brewster surface, and 3) Brewster reflector;
(6) selecting said birefringent element from the group consisting of 1) said nonlinear crystal means, and 2) said birefringent etalon;
(7) selecting said laser cavity from the group consisting of 1) regular standing-wave cavities; 2) V-shaped standing-wave cavities; and 3) L-shaped standing-wave cavities;
(8) building said two-dimensional beam expander means up of an AR coated lens pair; which additionally comprises the steps of
  A. placing an aperture means at the focal plane of said object lens where a diffraction-limited point occurs, so that said beam expander means is configured as a spatial filter likewise in conjunction with said aperture means, whereby leading to $TEM_{00}$ mode operation and an output with an excellent spatial quality;
  B. keeping a proper defocusing for said beam expander means whereby achieving compensation of the thermal lens effect leading to stable laser operations; and
  C. locating said nonlinear crystal means adjacent to said aperture means or within the unexpanded beam portion.

3. In the method of claim 2, wherein said spectral filter means consists of at least one Lyot filter, in order to protect the laser polarization at the fundamental wavelength from being altered or affected by the amount of birefringence of said nonlinear crystal means and said laser medium means; further comprising the steps of
  (1) keeping said nonlinear crystal means to have a constant effective length to produce a phase retardation to be a half integral multiple of said fundamental wavelength, and
  (2) selecting said laser medium from the group consisting of 1) nonbirefringent laser medium, 2) laser medium made and oriented without the exhibition of birefringences, and 3) birefringent laser medium having a constant effective length to produce a phase retardation to be a half integral multiple of said fundamental wavelength.

4. In the method of claim 2, further comprising the steps of
  (1) maintaining a constant cavity length whereby stabilizing operation frequency;
  (2) maintaining a constant temperature for said nonlinear crystal means whereby providing the best result for frequency conversion and minimizing cavity losses for the oscillating mode;
  (3) constructing a wavelength tuning form for the alignment of said etalon transmission peak to said laser oscillation frequency; and
  (4) constructing a defocusing control means for said two-dimensional beam expander means, wherein the degree of said defocusing is controlled by said control means for different pump and output power levels whereby obtaining good stability against thermal lens fluctuations.

5. In the method of claim 1, wherein said approach is said second approach, further comprising the steps of
  (1) using a nonlinear crystal means arranged in an optimal condition including phase-matching for intracavity frequency conversion;
  (2) maintaining the bandwidth of said spectral filter means is smaller than the laser longitudinal oscillating mode interval of said cavity, and its free spectral range is larger than the FWHM of lasing bandwidth of the gain medium, whereby to control the residual spatial hole burning;
  (3) selecting said spectral filter from the group consisting of
    A. Lyot filters, formed by a polarizing means and a birefringent element; and
    B. etalons, including 1) regular etalons, 2) said quarter-wave plate, and 3) birefringent etalons, in the later two cases said etalon acts likewise as an additional Lyot filter in conjunction with said polarizing means;
  (4) selecting said polarizing means from the group consisting of 1) Brewster plate, 2) Brewster surface, and 3) Brewster reflector;
  (5) selecting said birefringent element from the group consisting of 1) said nonlinear crystal means, 2) said pair of quarter-wave plates, and 3) said birefringent etalon;
  (6) selecting said laser medium means from the group consisting of 1) nonbirefringent laser medium, 2) laser medium made and oriented without the exhibition of birefringences, and 3) birefringent laser medium having a constant effective length to produce a phase retardation to be a half integral multiple of said fundamental wavelength, whereby to protect said "twisted mode" operation from being degraded by the amount of birefringence of said laser medium means;
  (7) selecting said laser cavity from the group consisting of 1) regular standing-wave cavities; 2) V-shaped standing-wave cavities; and 3) L-shaped standing-wave cavities;
  (8) selecting said beam expander means to be a two-dimensional beam expander means built up of an AR coated lens pair; which additionally comprises the steps of
    A. placing an aperture means at the focal plane of said object lens where a diffraction-limited point occurs, so that said beam expander means is configured as a spatial filter likewise in conjunction with said aperture means, whereby leading to $TEM_{00}$ mode operation and an output with an excellent spatial quality;
    B. keeping a proper defocusing for said beam expander means whereby achieving compensation of the thermal lens effect leading to stable laser operations; and
    C. locating said nonlinear crystal means adjacent to said aperture means or within the unexpanded beam portion.

6. In the method of claim 5, further comprising the steps of
  (1) keeping said nonlinear crystal means to have a constant effective length to produce a phase retardation to be a half integral multiple of said fundamental wavelength, whereby to protect the polarization and eigenvector of laser operation at the fundamental wavelength from being altered or affected by the amount of birefringence of said nonlinear crystal means;
  (2) maintaining a constant cavity length whereby stabilizing operation frequency;
  (3) maintaining a constant temperature for said nonlinear crystal means whereby providing the best result for frequency conversion and minimizing cavity losses for the oscillating mode;
  (4) constructing a wavelength tuning form for the alignment of said etalon transmission peak to said laser oscillation frequency; and (5) selecting a defocusing control means for said two-dimensional beam expander means, wherein the degree of said defocusing is controlled by said control means for different pump and output power levels whereby obtaining good stability against thermal lens fluctuations.

7. In the method of claim 1, wherein
(1) said approach is said second approach;
(2) said beam expander means is a prism beam expander which acts inherently as a polarizer likewise and is placed between said pump head means and said nonlinear crystal means, whereby 1) to reduce the insertion losses of intracavity optical elements, particularly for said etalon and said Lyot filter, and 2) to provide both large and small beam waists in one compact cavity, whereby to be able to achieve mode-matched pumping and efficient intracavity frequency conversion at the same time;
(3) said gain region is in the shape of a thin layer whereby accommodating the one-dimensional mode expanding; and further comprising the steps of
   (3) using a nonlinear crystal means located within the unexpanded beamportion and arranged in an optimal condition including phase-matching for intracavity frequency conversion,
   (4) maintaining the bandwidth of said spectral filter means is smaller than the laser longitudinal oscillating mode interval, and its free spectral range is larger than the FWHM of lasing bandwidth of the gain medium, whereby to control the residual spatial hole burning;
   (5) selecting said spectral filter from the group consisting of
      A. Lyot filters, formed by said prism beam expander and a birefringent element; and
      B. etalons, including 1) regular etalons, 2) said quarter-wave plate, and 3) birefringent etalons, wherein in the later two cases said etalon acts likewise as an additional Lyot filter in conjunction with said prism beam expander;
   (6) selecting said birefringent element from the group consisting of 1) said nonlinear crystal means, 2) said pair of quarter-wave plates, and 3) said birefringent etalon;
   (7) selecting said laser medium means from the group consisting of 1) nonbirefringent laser medium, 2) laser medium made and oriented without the exhibition of birefringences, and 3) birefringent laser medium having a constant effective length to produce a phase retardation to be a half integral multiple of said fundamental wavelength, whereby to protect said "twisted mode" operation from being degraded by the amount of birefringence of said laser medium means.

8. In the method of claim 7, further comprising the steps of
(1) keeping said nonlinear crystal means to have a constant effective length to produce a phase retardation to be a half integral multiple of said fundamental wavelength, whereby to protect the polarization and eigenvector of laser operation at the fundamental wavelength from being altered or affected by the amount of birefringence of said nonlinear crystal means;
(2) selecting said laser cavity from the group consisting of 1) regular standing-wave cavities; 2) V-shaped standing-wave cavities; and 3) L-shaped standing-wave cavities;
(3) constructing a form for maintaining a constant cavity length for said cavity whereby stabilizing operation frequency, said form includes 1) selecting distance holders for said cavity forming means with a zero thermal expansion coefficient at room temperature, 2) selecting a temperature compensation cavity structure for said cavity forming means, and 3) selecting a temperature control means for maintaining a constant temperature for said cavity;
(4) constructing a temperature control means for said nonlinear crystal means to maintain a constant temperature in the optimal condition whereby providing the best result for frequency conversion and minimizing cavity losses for the oscillating mode; and
(5) constructing a wavelength tuning form for the alignment of said etalon transmission peak to said laser oscillation frequency; said tuning form includes 1) temperature tuning, and 2) angle tuning, in which the rotation axis of said etalon must be perpendicular to the plan expanded by said prism beam expander whereby reducing the etalon walk-off loss.

9. In the method of claim 1, further selecting a nonlinear crystal means arranged in an optimal condition including phase-matching for intracavity frequency conversion, wherein said frequency conversion includes
(1) second harmonic generation, wherein said nonlinear crystal including KTP;
(2) resonantly enhanced second harmonic generation, wherein
   A. said nonlinear crystal means including KTP;
   B. said spectral filter is said regular etalon; and
   C. said cavity arrangement is configured to resonate at said second harmonic frequency by a phase compensator means or cavity distance adjustor means whereby largely enhancing the intensity of said second harmonic radiation and the conversion efficiency;
(3) third harmonic generation, wherein
   said nonlinear crystal means is two nonlinear crystals positioned serially, in which the first crystal is set with type I phase-matching for doubling said fundamental radiation to produce the SHG, and the second crystal is set with type II phase-matching to mix said fundamental and second harmonic radiations so as to produce the THG;
(4) third harmonic generation with resonant harmonic generation, wherein
   A. said nonlinear crystal means is two nonlinear crystals positioned serially, in which the first crystal is set with type I phase-matching for doubling said fundamental radiation to produce the SHG, and the second crystal is set with type II phase-matching to mix said fundamental and second harmonic radiations so as to produce the THG;
   B. said spectral filter is said regular etalon; and
   C. said cavity arrangement is configured to resonate at said second harmonic frequency by a phase compensator means or cavity distance adjustor means whereby largely enhancing the intensity of said second harmonic radiation and the conversion efficiency;
(5) fourth harmonic generations, wherein
   said nonlinear crystal means is three nonlinear crystals positioned serially, in which the first crystal is set with type I phase-matching for doubling said fundamental radiation to produce the SHG, the second crystal is set with type II phase-matching to mix said fundamental and second harmonic radiations for producing the THG, and the third crystal is set with type I phase-matching to mix said fundamental and third harmonic radiations so as to produce the FHG;

(6) fourth harmonic generation with resonant harmonic generation, wherein
  A. said nonlinear crystal means is two nonlinear crystals positioned serially, in which the first crystal is used for doubling said fundamental radiation to a second harmonic radiation, and the second crystal is for doubling said second harmonic radiation to a quadrupling harmonic radiation;
  B. said spectral filter is said regular etalon; and
  C. said cavity arrangement is configured to resonate at said second harmonic frequency by a phase compensator means or cavity distance adjustor means whereby largely enhancing the intensity of said second harmonic radiation and the conversion efficiency;

(7) frequency mixing, wherein
  A. further selecting an input radiation, including a resonantly enhanced input; and
  B. said nonlinear crystal means mixes said fundamental and said input radiations to a mixing radiation; and (8) frequency mixing with resonant harmonic generation, wherein
  A. further selecting an input radiation;
  B. said nonlinear crystal means is two nonlinear crystals positioned serially, in which the first crystal is used for doubling said fundamental radiation to produce the SHG, and the second crystal mixes said second harmonic and said input radiations to a mixing radiation;
  C. said spectral filter is said regular etalon; and
  D. said cavity arrangement is configured to resonate at said second harmonic frequency by a phase compensator means or cavity distance adjustor means whereby largely enhancing the intensity of said second harmonic radiation and the conversion efficiency.

* * * * *